US012379889B2

(12) United States Patent
Fitzgerald et al.

(10) Patent No.: US 12,379,889 B2
(45) Date of Patent: *Aug. 5, 2025

(54) MULTI-PANEL, MULTI-COMMUNICATION VIDEO WALL AND SYSTEM AND METHOD FOR SEAMLESSLY ISOLATING ONE OR MORE PANELS FOR INDIVIDUAL USER INTERACTION

(71) Applicant: PanoScape Holdings, LLC, Oakbrook Terrace, IL (US)

(72) Inventors: Jeremiah Fitzgerald, Wheaton, IL (US); Matthew Mascheri, Oakbrook Terrace, IL (US); John Clarke, Oakbrook Terrace, IL (US)

(73) Assignee: PanoScape Holdings, LLC, Oakbrook Terrace, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,528

(22) Filed: Dec. 15, 2023

(65) Prior Publication Data
US 2024/0111474 A1    Apr. 4, 2024

Related U.S. Application Data

(63) Continuation-in-part of application No. 18/232,662, filed on Aug. 10, 2023, and a continuation of
(Continued)

(51) Int. Cl.
*H04N 5/445* (2011.01)
*G06F 3/044* (2006.01)
(Continued)

(52) U.S. Cl.
CPC ............ *G06F 3/1446* (2013.01); *G06F 3/044* (2013.01); *H04N 21/42204* (2013.01); *G06F 3/017* (2013.01); *H04N 21/42224* (2013.01)

(58) Field of Classification Search
CPC ............ H04N 5/23238; H04N 5/4403; H04N 5/44591; H04N 5/445; H04N 2005/443; H04N 21/42224; H04N 21/42204; G06F 3/1446; G06F 3/044; G06F 3/017; G06F 3/1423; G06F 3/1431; G06K 9/00288; G06K 9/00362; G06K 2009/00322; G09G 2300/026
(Continued)

(56) References Cited

U.S. PATENT DOCUMENTS 6,118,433 A    9/2000  Jenkin et al.
6,680,714 B2   1/2004  Wilmore
(Continued)

*Primary Examiner* — Sherrie Hsia
(74) *Attorney, Agent, or Firm* — Kaspar Law Company, LLC; Scott R. Kaspar

(57) ABSTRACT

A video wall and system is disclosed having a computer with a memory or access to a public or private cloud containing a video file and a processor for executing the video file and a plurality of light emitting diode (LED) tiles interconnected to one another and to the computer via wired or wireless transmission, each of the plurality of LED tiles configured to work together to display a video content generated from the video file that extends across all of the plurality of LED tiles. Upon user interaction or detection of a user, one or more of the plurality of LED tiles seamlessly transitions away from the video content to display a separate video content for interaction with the user.

20 Claims, 17 Drawing Sheets

Related U.S. Application Data application No. 17/669,354, filed on Feb. 11, 2022, now Pat. No. 11,886,766.

(51) Int. Cl.
*G06F 3/14* (2006.01)
*H04N 21/422* (2011.01)
*G06F 3/01* (2006.01)

(58) Field of Classification Search
USPC ......... 348/383, 563, 564, 588, 739; 345/1.1, 345/1.3, 30
See application file for complete search history.

(56) References Cited

U.S. PATENT DOCUMENTS

| | | |
|---|---|---|
| 7,082,398 B1 | 7/2006 | Apple et al. |
| 9,148,614 B2 | 9/2015 | Szolyga et al. |
| 9,535,649 B2 | 1/2017 | Cope et al. |
| 9,741,316 B2 | 8/2017 | Loeffler et al. |
| 9,811,303 B2 | 11/2017 | Choi |
| 9,824,624 B2 | 11/2017 | Howard et al. |
| 9,854,613 B2 | 12/2017 | Son |
| 9,911,176 B2 | 3/2018 | Griffin et al. |
| 9,911,243 B2 | 3/2018 | Vats |
| 9,911,396 B2 | 3/2018 | Chen et al. |
| 9,917,866 B2 | 3/2018 | Zhang et al. |
| 2006/0028398 A1 | 2/2006 | Willmore |
| 2012/0038561 A1 | 2/2012 | Han |
| 2015/0286456 A1 | 10/2015 | Griffin et al. |
| 2016/0132174 A1 | 5/2016 | Yoo et al. |
| 2016/0162245 A1 | 6/2016 | Choi |
| 2016/0162247 A1 | 6/2016 | Bryczkowski |
| 2016/0266860 A1 | 9/2016 | Nam |
| 2016/0306603 A1 | 10/2016 | Nadeson |
| 2016/0358582 A1 | 12/2016 | Lee et al. |
| 2017/0060319 A1 | 3/2017 | Seo et al. |
| 2017/0206854 A1 | 7/2017 | Erhart |
| 2018/0052652 A1 | 2/2018 | Kim et al. |
| 2018/0059774 A1 | 3/2018 | Lee et al. |

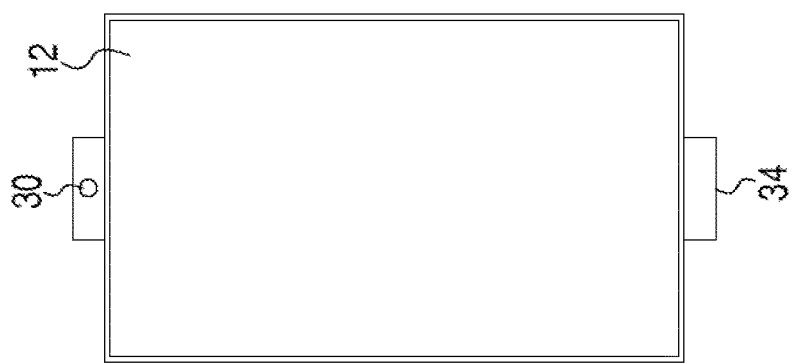
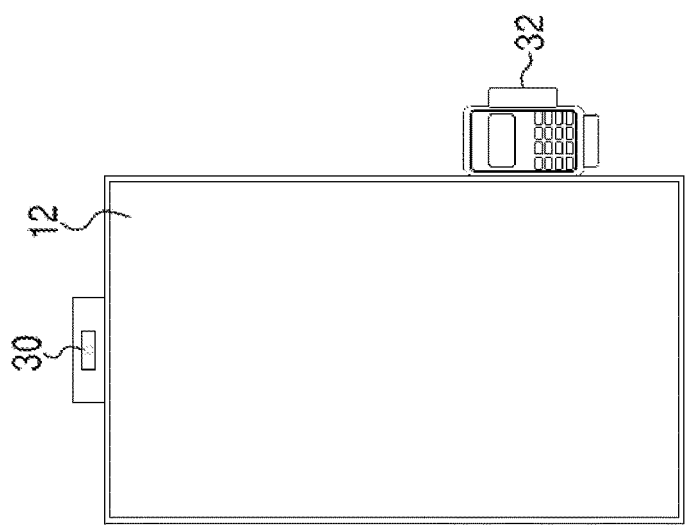
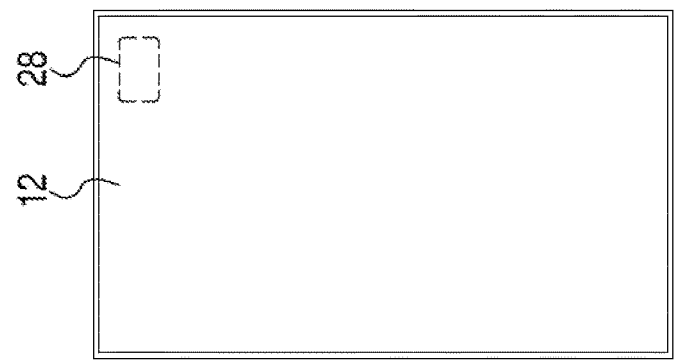

MULTI-PANEL, MULTI-COMMUNICATION VIDEO WALL AND SYSTEM AND METHOD FOR SEAMLESSLY ISOLATING ONE OR MORE PANELS FOR INDIVIDUAL USER INTERACTION

CROSS-REFERENCE TO RELATED APPLICATIONS

This application is a continuation-in-part of, and claims the benefit of priority to, U.S. patent application Ser. No. 18/232,662 filed Aug. 23, 2023 and U.S. patent application Ser. No. 17/669,354 filed Feb. 11, 2022 (now U.S. Pat. No. 11,886,766), both of which are continuations of U.S. patent application Ser. No. 17/182,342 filed Feb. 23, 2021 (now U.S. Pat. No. 11,340,856), which is a continuation of U.S. patent application Ser. No. 16/889,689 filed Jun. 1, 2020 (now U.S. Pat. No. 10,963,206), which is a continuation of U.S. patent application Ser. No. 16/597,800 filed Oct. 9, 2019 (now U.S. Pat. No. 10,705,782), which is a continuation of U.S. patent application Ser. No. 16/449,425 filed Jun. 23, 2019 (now U.S. Pat. No. 10,540,135), which is a continuation of U.S. patent application Ser. No. 16/114,425 filed Aug. 28, 2018 (now U.S. Pat. No. 10,372,402), which claims the benefit of priority to U.S. Provisional Patent Application No. 62/648,913 filed Mar. 27, 2018, U.S. Provisional Patent Application No. 62/669,334 filed May 9, 2018, and U.S. Provisional Patent Application No. 62/672,097 filed May 16, 2018, each of which is incorporated by reference herein in its entirety.

TECHNICAL FIELD

The present invention relates to a video wall and system, and more particularly, a plurality of display screens forming a panoramic video wall, each display of which can seamlessly transition to a stand-alone basis for individual user interaction.

BACKGROUND

There exists in the art video walls, including panoramic video walls, that are comprised of a plurality of display screens or panels. The display screens or panels work together to display one video instance that extends across the screens to create a video wall or panoramic effect.

Many of the conventional video walls are comprised of touch-screen displays, which are configured to interact with a person through capacitive means when the person touches the screen, such as with a human finger or a stylus. In this manner, a person can interact with the touch-screen video wall by touching an area of the display screens, which often times triggers a dialogue box or separate window to launch.

One example of a prior art video wall system utilizing touch-screen displays is the Accenture Interactive Network located in the American Airlines terminal at O'Hare International Airport in Chicago, Illinois. The Accenture Interactive Network is a video wall comprised of nine touch-screen displays, which allows one or more users to interact with the video wall at the same time. The display screens forming the Accenture Interactive Network all work together, displaying the same video output relating to a single executable file, and when one or more users interacts with the Accenture Interactive Network, the users are interacting with the same executable file, which causes certain windows and/or interactive imagery to be displayed on a portion of one or more display screens located proximate to the user. But at no time during the user interaction does any one of the nine display screens transition away from the video wall presentation and act independently to display separate content.

None of the prior art video walls provides for display screens that can seamlessly transition away from the singular video wall experience to provide a user with a unique interactive environment displayed only on the screen in which the user is physically interacting, through touchscreen or other means.

SUMMARY OF THE INVENTION

According to one non-limiting aspect of the present disclosure, an example embodiment of a multi-panel video wall and system for seamlessly isolating one or more panels for individual user interaction is disclosed. The exemplar system includes a computer with a memory or access to a public or private cloud containing a video file and a processor for executing the video file and a plurality of video display screens interconnected to one another and to the computer via wired or wireless transmission, each of the plurality of video display screens configured to work together to display a video content generated from the video file that extends across all of the plurality of video display screens. Upon user interaction or detection of a user, one or more of the plurality of video display screens seamlessly transitions away from the video content to display a separate video content for interaction with the user.

According to another non-limiting aspect of the present disclosure, an example embodiment of a method for seamlessly isolating one or more panels of a multi-panel video wall for individual user interaction is disclosed. The method includes the steps of providing a computer having a memory containing a video file and a processor for executing the video file, the computer being interconnected with the plurality of video display screens and having an Internet connection for accessing a remote Javascript database; displaying a video content across all of the plurality of video display screens, the video content generated from the video file; detecting a user interacting with one of the plurality of video display screens and seamlessly transitioning said one of the plurality video display screens from the video content to a separate video content for interaction with the user; and displaying the separate interactive video content on said one of a plurality of video display screens interacting with the user.

According to yet another non-limiting aspect of the present disclosure, another example embodiment of a method for seamlessly isolating one or more panels of a multi-panel video wall for individual user interaction is disclosed. The method includes the steps of providing a computer having a memory containing a video file and a processor for executing the video file, the computer being interconnected with the plurality of video display screens and having an Internet connection for accessing a remote Javascript database; providing at least one camera operatively connected to one or more of the video display screens; displaying a video content across all of the plurality of video display screens, the video content generated from the video file; detecting a user interacting with one of the plurality of video display screens and further detecting one or more physical characteristics relating to the user; identifying a separate video content for displaying to the user based on one or more of the detected physical characteristics of the user; seamlessly transitioning said one of the plurality video display screens from the video content to the separate video content for interaction with the user; and displaying the separate interactive video content on said one of a plurality of video display screens interacting with the user.

Additional features and advantages are described herein, and will be apparent from the following Detailed Description and the figures.

BRIEF DESCRIPTION OF THE DRAWINGS

Features and advantages of the multi-panel video wall and system and method for seamlessly isolating one or more panels for individual user interaction described herein may be better understood by reference to the accompanying drawings in which:

FIG. 4 depicts an exemplar panel of the multi-panel video wall system, in which a region of the panel contains an Easter egg (a hidden non-visible feature) for triggering a separate stand-alone interactive display environment;

FIG. 5A depicts an exemplar panel of the multi-panel video wall system, in which one or more peripheral devices, such as a camera or credit card reader, are configured to connect with the panel;

FIG. 5B depicts an exemplar panel of the multi-panel video wall system, in which additional peripheral devices, such as a bar code scanner or near field communication devices, are configured to connect with the panel;

The reader will appreciate the foregoing details, as well as others, upon considering the following Detailed Description of certain non-limiting embodiments of the multi-panel video wall and system according to the present disclosure. The reader may also comprehend certain of such additional details upon using the multi-panel video wall and system described herein.

DETAILED DESCRIPTION

The present disclosure, in part, is directed to a multi-panel video wall and system and method for seamlessly isolating one or more panels for individual user interaction. The novelty of the present invention is demonstrated by the fact that: (1) it was awarded and named "Best New Interactive Digital Signage Product" at the 2018 Digital Signage Exposition (DSE 2018), held Mar. 28-29, 2018, at the Las Vegas Convention Center, in Las Vegas, Nevada; (2) it was awarded and named a finalist for the "AV Awards 2018" in the "Interactive Display Product of the Year" category by AV Magazine on Jul. 23, 2018; and (3) it was awarded and named "Best New Digital Signage Product" at the 2019 Interactive Customer Experience (ICX) Awards on Jun. 4, 2019, in Dallas, Texas.

Figure 1:
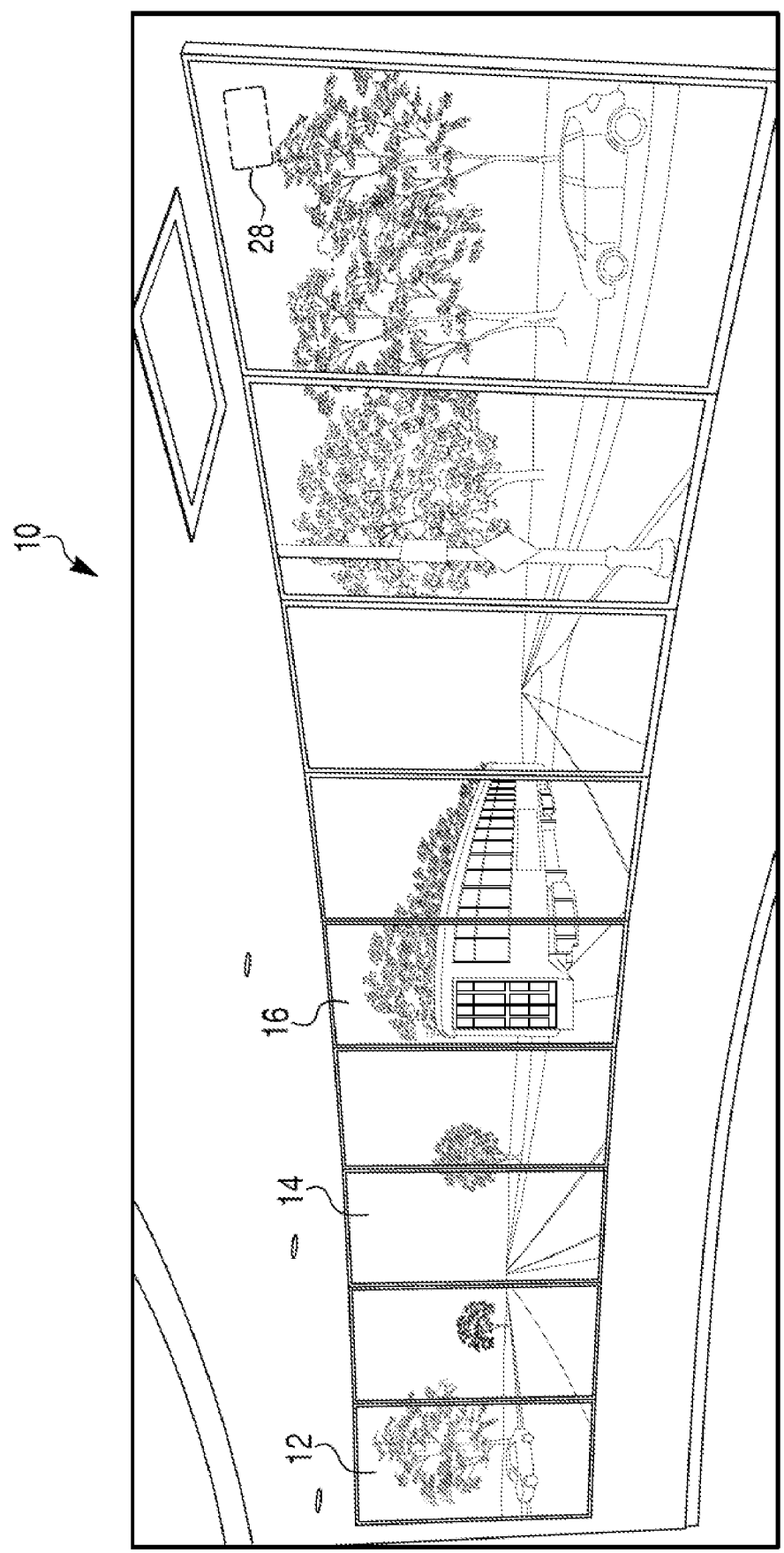
FIG. 1 depicts an exemplar multi-panel video wall system, in which all of the display panels are working together to display one panoramic video.

As shown in FIG. 1, a panoramic video wall (10) is shown in which a plurality of video display modules (e.g., display panels, display screens, display tiles, modular tiles) (12, 14, 16) are working together to display one video image. In the instance shown in FIG. 1, nine display panels are utilized, each display panel being a touch-screen display. Any number of touch-screen displays can be utilized, though current practical limitations on resolution and processing speeds dictates that a video wall should have no more than 18 such displays. Those skilled in the art will appreciate that future improvements in displays, including resolution, as well as computer processing speeds and capabilities may allow for video walls to be comprised of more than 18 displays.

Display modules or panels (12, 14, 16) may be of a touch-screen display, utilizing capacitive or other technology that receives user input through physical touch, such as with a human finger or a stylus. The displays also may be LED panels or tiles, placed side by side, such as so-called zero-bezel displays in which the LED panels are configured to illuminate images all the way out to the edges of the panels. The displays also may be a single large LED display in which separate content may be displayed on different portions of the singular display. Alternatively, the displays may utilize other sensing technologies, such as infrared/ depth sensing camera detection (e.g., Leap Motion, Inc.'s Leap Motion® controller), gesture registration, motion sensing, facial recognition, depth sensing, or near field communication. An example of a particular make and model of touch-screen display that would be suitable with a video wall of the present disclosure is the Elo® 7001LT. Such a display typically has a diagonal dimension of about 70 inches and a High Definition (HD) resolution of 1920×1080. Many such displays are powered by a light-emitting diode (LED) panel, with a brightness of about 700 nits. A panoramic video wall as shown in FIG. 1 with nine such displays, therefore, would have an overall length of about 27 feet, with a resolution up to about 20,000 by 4,000 (20K× 4K) that can be displayed, although in many typical applications, the resolution is 9720×1920 (10K×2K). Such configuration also allows for multiple video content to be played at once, such as two videos each having 4K resolution playing simultaneously, each across multiple displays.

As shown in FIG. 1, the display modules or panels (12, 14, 16) are interconnected such that each display is in a portrait or vertical orientation. A portrait orientation provides for a video wall (10) having a larger height, particular when the video wall is comprised of multiple 70-inch display panels, as shown in FIG. 1. However, the display modules or panels (12, 14, 16) may be interconnected in a landscape or horizontal orientation. A landscape orientation may be preferable for incorporating other such applications, such as a Microsoft® PowerPoint® slideshow, which typically is formatted for a landscape orientation.

Figure 2:
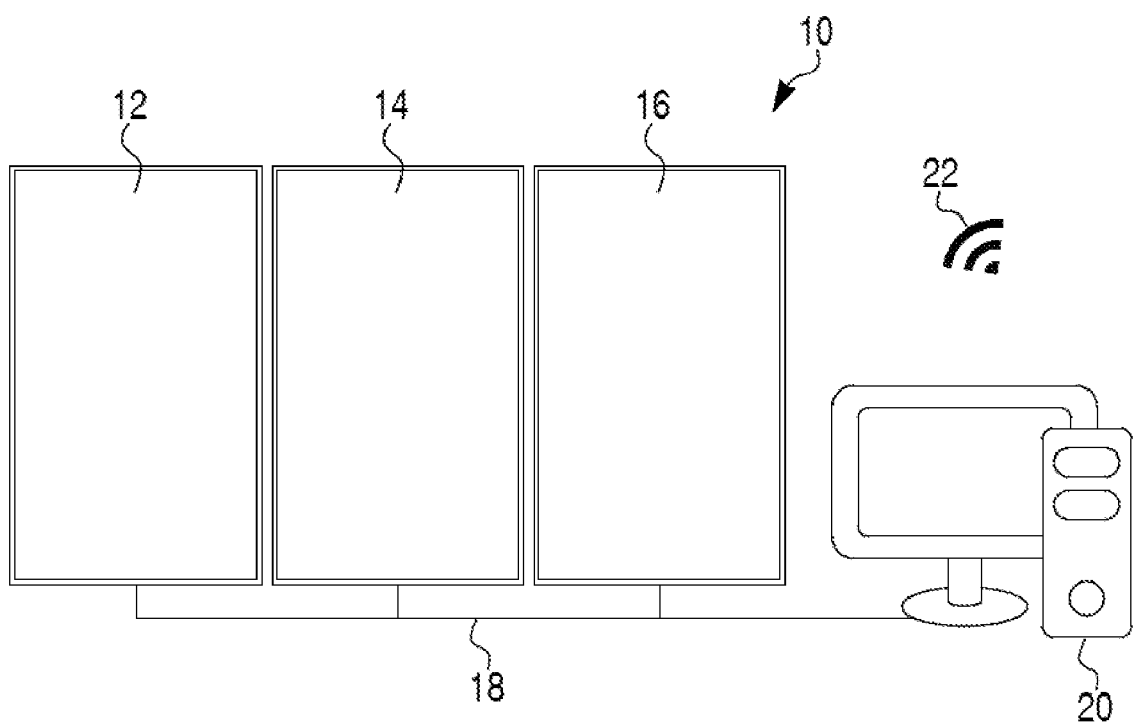
FIG. 2 depicts a schematic view of the exemplar multi-panel video wall system shown in FIG. 1.

As shown in FIG. 2, a panoramic video wall (10), such as that disclosed in FIG. 1, comprises one or more display screens (12, 14, 16) interconnected with one another via cabling (18) and with a computer (20) or other electronic device containing a central processing unit for processing one or more executable files stored in a memory. Computer (20) also may be connected to a public or private cloud, or other Internet based database, for downloading and/or updating the executable files stored locally or for storing the executable files in the cloud. Cabling (18) may be any suitable cable capable of transmitting audio and video signals, including (but not limited to) HDMI, USB, VGA, or Ethernet cabling, or any other such cabling configured to connect with HDMI, USB, VGA, or Ethernet ports of a computer. Alternatively, the display screens may be interconnected to the computer (20) via wireless network (22), such as through a wi-fi network, or through wireless transmission, such as via Bluetooth® transmission. Computer (20) is any standard microprocessor capable of providing audio and video signals to the display screens of the video wall (10). One example of computer (20) is a Dell® professional desktop computer having a processor and graphics card sufficient to control a multi-panel video wall. Another example of computer (20) is the Intel® Nuc® mini PC, which has a graphics card of sufficient capability and an overall size that makes this computer ideal for portable or mobile uses. Preferably, computer (20) has a Matrox C900 graphics card, or any such graphics card of similar or better capabilities. Alternatively, computer (20) may be a tablet, phone, or other electronic device capable of providing audio and video signals to the display screens of the video wall (10), including (but not limited to) an AppleTV®, Roku®, Hulu®, or Amazon® Fire Stick® transmitter, or through any such electronic device configured to transmit streaming media, such as those configured for AppleTV®, Hulu®, Netflix®, and/or Amazon® Fire® networks. Computer (20) also may be comprised of a network hub device, such as Google® Hub® or Amazon® Alexa®, which is connected to the Internet and interacts with streaming services, such as those provided by Google® or Amazon®, as examples.

Alternatively, the video wall (10) may be comprised of multiple stand-alone devices, such as one or more sets of display devices, including one or more of the display panels, display screens, display tiles, and/or modular tiles described above, working in tandem with a display table, a kiosk, and/or any tablet, smart phone or laptop, such that the entirety of the video wall (10), working in tandem with any ancillary device, displays video content, and the interaction with any one particular display or device initiates the sequence of seamlessly transitioning that particular display or device into an interactive user environment.

What is unique about the multi-panel video wall and system (10) of the present disclosure is that an individual display screen (12, 14, 16), or one or more individual display screens, can seamlessly transition from displaying video wall content to acting as a stand-alone screen displaying individual content based on user interaction.

Figure 3:
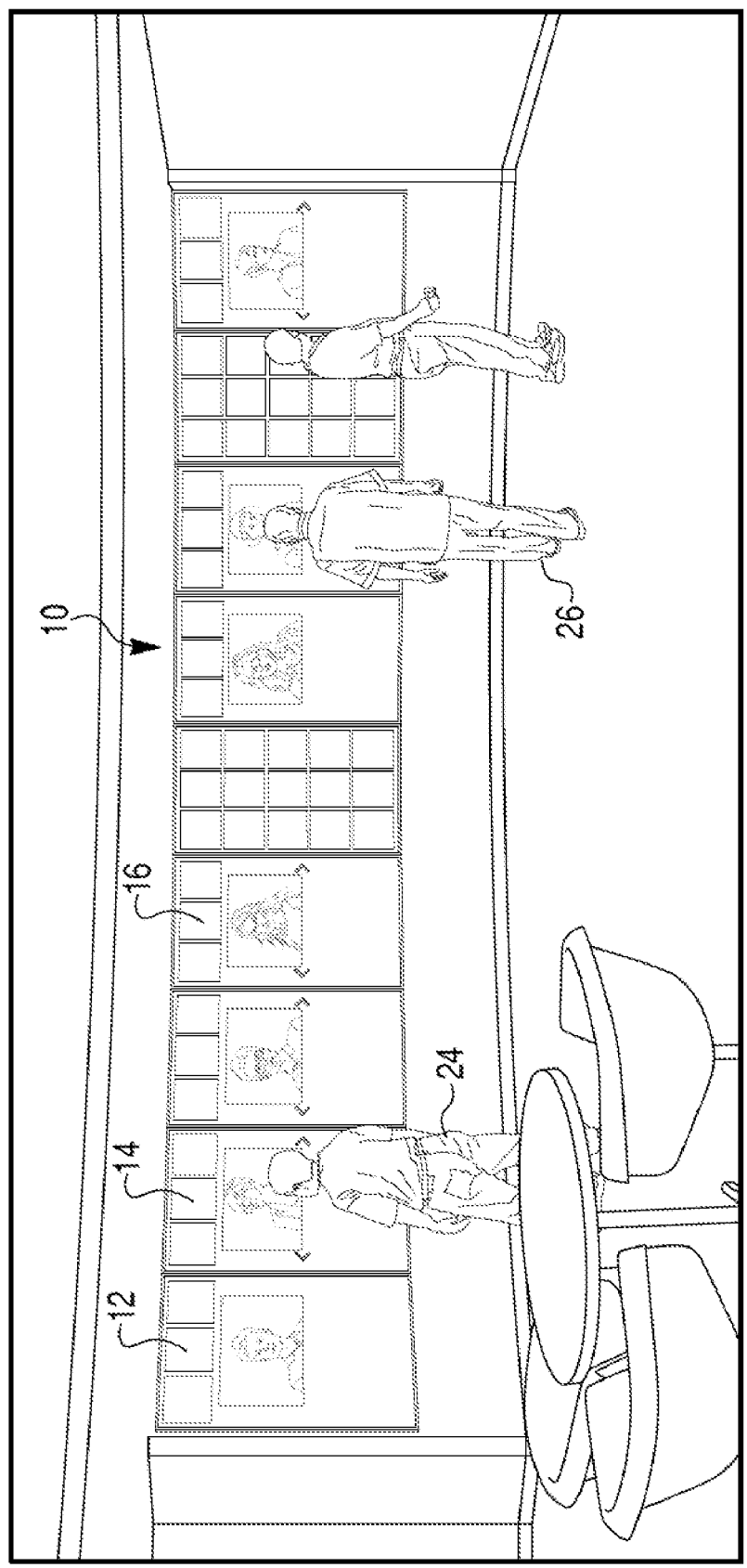
FIG. 3 depicts an exemplar multi-panel video wall system, in which a plurality of users are interacting with the video wall system, thereby causing individual display screens to seamlessly transition away from the video wall and into separate, stand-alone interactive display environments.

As shown in FIG. 3, one or more users (24, 26) initiate user interaction with the video wall (10) by tapping or touching on a particular display screen (12, 14, 16) with a finger or stylus. Alternatively, the display screen may utilize other sensing technologies, such as infrared/depth sensing camera detection (e.g., Leap Motion, Inc.'s Leap Motion® controller), gesture registration, motion sensing, facial recognition, depth sensing, or near field communication. The video wall (10) acknowledges the user's presence and desire to interact with a particular display screen (12, 14, 16) and seamlessly transitions that that particular display screen and/or one or more of the display screens from the video wall content to a stand-alone environment wherein each display screen displays individualized content to the user that is separate and independent from the video content displayed on the remaining display screens of the video wall.

Prior to a user interaction, the video wall (10) is acting in a default or resting mode in which a panoramic video is displayed across all of the display screens. Alternatively, in the default or resting mode, each display screen may be displaying separate or individual content and, upon interaction by a user, all of the display screens of the video wall (10) transition to a panoramic video displayed across all of the screens. The panoramic video is generated from a video file residing on the computer memory that is processed by the computer (20) utilizing a graphics card and graphics application. In one non-limiting embodiment, the video file is compiled using React components, including, for instance, the React JavaScript library. Processing of the video file is accomplished by using a suitable graphics card, and in one non-limiting embodiment, a Matrox® C900 graphics card, or such graphics card of similar capabilities, is used to process the video file. The resulting audio and video signals are then provided to the plurality of display screens (12, 14, 16) via cabling 18, which may include HDMI, USB, and/or Ethernet cables, or through wireless transmission (22).

When a user (24, 26) begins interaction with an individual display screen (12, 14, 16), such as by tapping on the screen, or through any other user detection means as described above, the video wall (10) acknowledges that a user desires to interact with the individual display screen and isolates that particular display screen, or one or more display screens, from the rest of the video wall by seamlessly transitioning the displayed content on that display screen from the panoramic video to an individualized interactive environment. Alternatively, more than one display screen, or all of the display screens of the video wall (10), may transition from the panoramic video to the interactive environment upon user interaction with any one display screen. For example, a set of display screens (e.g., three adjacent display screens) may transition from the video wall environment to the interactive environment upon interaction with a user such that the set of display screens work together to display a singular interactive environment content to the user, while the remainder of the video wall may continue to display the video wall environment.

In specific, a user presses or taps on any of the display screens (12, 14, 16), thereby activating one or more software scripts, which in turn transform content displayed from the panoramic video to an interactive state. The interactive user environment typically is facilitated by having a front end which displays the imagery to the user and pulls instructions and content from a backend or content management software (CMS) database. In one non-limiting embodiment, the front end is facilitated by a JavaScript library, such as the React application, running on a web browser, such as the Google® Chrome® web browser, though other front end software such as Electron and/or web browsers may be suitable. In another non-limiting embodiment, the front end is facilitated by software such as the Unreal® engine, which may be executed from a central location, i.e., a centralized CPU powering the entire video wall, or may be loaded onto a remote device, such as a Raspberry®, such that each video display is separately powered to carry out all of the content.

The front end software (e.g., React, Electron, or Unreal application) pulls instructions and content from the backend, such as Drupal or Symphony, both of which are open source CMS databases. Those skilled in the art will understand that instructions and content may be comprised of JavaScript Object Notation (Json), Extensible Mark-up Language (.xml), Hypertext Preprocessor (PHP) scripting language, object oriented query language such as .QL, Sequel (SQL) formatted components, among others. The instructions and content also may be batched files, or may be executable files, such as any CMS software. The instructions and content may be encrypted or otherwise secured, such as by using secure sockets layer (SSL) protocol. As one particular example, the front end software (e.g., React, Electron, or Unreal application) pulls instructions from Nodejs, a JavaScript component, through which the CMS (e.g., Drupal, Symphony) serves the content. Then, the CMS pulls from SQL as well as updates from Json databases, all residing in the cloud, which the CMS uses to update the displayed .xml files.

As another particular example, the front end software (e.g., React application) may pull certain CMS content, such as, for instance, Json files, from a secure cloud-based database, which may be a relational database or a non-relational or NoSQL database. One example of a document-based database for storing Json documents is that operated by MongoDB, Inc. and known as the Mongo®, MongoDB®, or MongoDB Atlas® database. Similarly, the front end software (e.g., React application) may pull image and/or video files and content in a simple storage service ("S3"), such as an S3 bucket or account with Amazon® Web Services ("AWS"), which allows for fast access and download or execution of the files.

The uploading, updating, or changing of CMS content stored in document-based databases or S3 buckets can be protected by security or encryption such as through the use of SSL certificates, which may be specific to the changing of database content or the updating of new content. Content also may be updated regularly on scheduled intervals. The use of scheduler software, such as, for instance, Google® Calendar, provides for the scheduled update of database content, such that the video wall 10, or certain portions thereof, displays certain content at one time and other content at another scheduled time, depending on the needs of the owner of the video wall or the users interacting therewith.

The video content displayed on the video wall (10), either as the panoramic video display or as the interactive user environment, may be generated from any type of video file. Video content may include any video format, including without limitation: MPA, MP4, MP3, M4A, MKV, OGG Theora, TS, AVI, AVCHD, QT, MOV, VP4, H.264, H.265, WEBM, among any other suitable video file type or format. Video content also may include or be comprised of animations, graphics, GIFs, and other computer-generated content. Video content also may be generated by a streaming service or by streaming video over IP. Video content also may be comprised of cloud or internet-based executables or programs or services, such as, for instance, Google® Earth® or a Microsoft® 365® account, for the displaying of PowerPoint® presentation slides or electronic "white board" programs, among others.

In one non-limiting embodiment, the seamless transition from video wall to an independently-acting, stand-alone display is accomplished by the following steps. First, the CMS software (e.g., Drupal, Symphony) compiles the JavaScript and other components (e.g., Json and SQL databases) from the latest database served by the CMS. Then, the front end software (e.g., React or Electron application) pre-loads all content locally onto the computer memory such that the computer (20) locally hosts all content, including both the panoramic video and the interactive environment. The front end software then displays all content on the display screens (12, 14, 16) using a web browser (e.g., Google® Chrome® web browser).

Alternatively, the content may hosted remotely, such as in a public or private cloud or other remote server, which is either downloaded to computer (20) for presentation on video wall (10) or is streamed directly from the cloud or other remote network to the video wall. Live streaming of the video content may be achieved through live streaming protocols such as real-time messaging protocol (RTMP), such as that implemented by Instagram® and other live-video presentation applications, or hypertext live streaming (HLS) implemented by, for instance, AppleTV®.

Presentation of the video wall content may further be achieved by or through the operating system software residing on the display screens (12, 14, 16), which may be pre-loaded with batched or executable files, such as a CMS software, to pull instructions and content from a database (e.g., SQL database) to present the panoramic video and/or interactive user experience on the display screens of video wall (10). In this manner, a computer (20) may not be required to facilitate the processing and execution of the video wall (10) presentations, as the content would be processed and executed by the display screen operating software.

The front end software (e.g., React or Electron application) initially displays the interactive content on the display screens (12, 14, 16) upon loading. After a pre-determined amount of time, the front end software enters into a default or "resting state" mode, whereby the panoramic video is displayed across all display screens of the video wall (10). When a user touches any display panel during the resting mode, the CMS software (e.g., Drupal, Symphony) via Nodejs instructs the front end software (e.g., React or Electron application) to re-enter the interactive state, allowing that particular display screen (or a plurality of display screens) to receive individual user interactions.

Upon a user's (24, 26) completion of individual interaction with a display screen (12, 14, 16), such as by completion and/or submission of a separate program, scripts, and/or prompts or dialogue boxes, or through the timing-out of user interactions, the video wall (10) acknowledges that the user has finished interaction and transitions the display screens of the video wall from the interactive state back to the panoramic video or other resting mode. Alternatively, the particular display screen that the user was interacting with may transition back to the panoramic video or other resting mode, while one or more of the remaining display screens may continue to operate in an interactive mode.

The video wall (10) system may be further configured with analytics software, which may reside locally on the computer (20) or may be a web-based or otherwise cloud-based software that tracks interactions between users of the video wall, as may have utility for selection and placement of content and valuation of advertising, among other uses. Many types and kinds of analytics may be captured relating to user interaction with the video wall (10). For example, the specific content that is displayed and/or the content that is selected by the user may be captured for historical purposes, for security purposes, or for sales or marketing purposes, such as to identify trends that may be useful for determining a value of specific content. With selected content, the spatial positioning of the content with respect to the video wall (10) may be desirable to track, as well as the time of day. Analytics relating to user selection of content may help to optimize placement of certain content on the video wall (10), or may relate to the advertising value of that content.

Another example of analytics that may be captured from the video wall (10) is the roap map or traffic pattern of user selection. For instance, the specific series of "clicks," selections, or commands made by the user and where the user navigates from selection to selection may be captured. User interaction also may be captured through gesture analytics, wherein the video wall (10) has one or more devices (e.g., near-field communication devices, depth sensors, cameras or other optical devices) to discern or detect point, waving or movement of the hands, facial gestures, and/or eyeball movement and tracking. Skeletal tracking with depth sensors may be employed to detect the presence of one or more users at the video wall (10), and infrared and/or laser planes may be employed for detecting pointing at or gesturing near to the wall. Eyeball tracking may be employed not only to allow a user to navigate through the displayed content on the video wall (10), but eyeball tracking also may be employed to determine the total number of eyeballs engaging with content during a particular timeframe, such as per day or per month, which may be useful for optimizing content placement as well as valuation of the content for advertising purposes.

The dwell time that a user spends on any given selection, such as how long a user watches a specific video, may have tremendous value to content placement and be indicative of user preferences and enthusiasm for certain content. For instance, if a user selects a video and watches only a small percentage of the video before navigating elsewhere, that may be indicative that the user does not prefer the video or finds the video to be unenjoyable. Dwell time may translate to the value of including certain content and placement thereof.

Analytics may be captured and provided in a reporting setting, providing global statistics about overall user interaction, or it may be distilled down to a particular user or set of similar users, such as users of an age grouping, gender, or other category or classification of user, which the video wall (10) may assess or determine based on visual identification of the user or through near-field communication (e.g., Bluetooth® Beacon) or other detection of or interaction with user smart phones and devices. Reporting functionality may help optimize content placement as well as valuation of that content.

In an embodiment where the video wall (10) may be comprised of separate stand-alone devices, such as one or more displays (e.g., display screens, display tiles, display modules) working in tandem with one or more ancillary devices (e.g., display table, kiosk, tablet), analytics may be captured from any one of the devices, or all of the devices, as a plurality of users interact with the devices.

One specific example of analytics that may be configured for use with the video wall (10) is that provided by Google® Analytics®, which is a third-party, cloud-based software in which certain analytics are regularly extracted from the CMS software and provided to Google® Analytics® as a text file for data analysis and reporting.

As yet another alternative, the same user deliverable of a videowall seamlessly transitioning into one or more individual user experiences can be accomplished by a second method, in which the computer 20 is running a fully-compiled, executable file. The executable file takes all of the functionality described above but rewrites it as a Chromium-based application, but does not require the use of the Chrome® browser to run. Rather, the executable file may include an independent graphic user interface (GUI) that allows a user to provide certain functionality requirements, which then are carried out by the executable application. The executable file would continue to call on remote libraries and databases, as described above, which may be cloud-based. This could be accomplished by using a .JSON file, which directs the executable application to certain remote databases, such as those which store and/or host the CMS data.

Having an executable application provides at least three benefits. First, the application is more secure, because the code is compiled and safeguarded from user manipulation. Second, the application allows an end-user to have rights to update the remote CMS databases, in which displayed content may be updated or modified by an end-user, which would be carried out completely independently of the executable application. Third, because the executable application is self-contained, it can be packaged as an "app" that is portable and easily downloadable to an operating system platform. In this manner, the executable "app" can be downloaded onto an operating system of a display, as one example, which would then be immediately available for use and interconnection with the display operating software.

Alternatively, the same user deliverable of a videowall seamlessly transitioning into one or more individual user experiences can be accomplished by a third method, in which the computer 20 is running one or more individual instances of the CMS software, such as Drupal or Symphony. In such an alternative embodiment, each individual display screen (12, 14, 16) may be controlled by a separate instance of the video or other file being displayed, which may be a batch file or script (for instance, a batch file that would be processed or rendered by a web browser or other viewer software, such as Google® Chrome® web browser) or an executable file (for instance, an executable file read by the CMS software). When a user (24, 26) engages with a display screen (12, 14, 16), that separate instance acknowledges that the user is seeking to interact with the display screen and provides separate and particularized content to that display screen, based on the user interactive experience.

To facilitate the panoramic videowall experience, yet another instance of the CMS software (or other batched or executable file) may be opened and running on computer (20). That is, the computer (20) may be running one more instance than the total number of display screens (12, 14, 16). In the embodiment shown in FIG. 1, which is presented for illustrative purposes only, the computer (20) may be running nine individual and separate instances of the batched or executable file to control the individual content presented on each of the display screens. A tenth instance (that is, one instance in additional to the total number of instances running on each of the display screens) may be running on computer (20), and overlaid over the rest, to control the panoramic videowall, or the content intended to be presented over all of the display screens (12, 14, 16). In the particular arrangement shown in FIG. 1, the total number of instances of the batched or executable file running on the computer (20) is ten instances. In an arrangement where there are 18 display screens, the total number of instances of the batched or executable file may be 19, which is one instance for each individual display plus one instance to control the panoramic video or other display across all of the display screens (12, 14, 16).

In order to facilitate this alternative embodiment, a computer (20) having enhanced processing speeds may be necessary in order to facilitate a seamless transition between the panoramic videowall and any one of the individual instances of the batched or executable file running on computer (20) to deliver content to each of the display screens, or to receive input from any peripheral attached to said individual display screen, such as a camera (e.g., 02-series webcam), credit card or magnetic strip reader (MSR), 2-D bar code reader, near field communication and/or radio frequency identification (RFID) reader and/or radio frequency (RF) beacon, finger print reader, EMV (i.e., Europay, Mastercard, Visa) cradle, speech or voice recognition device, among many other peripherals. Processing speeds of computer (20) must be sufficient to accommodate the seamless transition from instance to instance as one or more users (24, 26) interact with the videowall (10) and trigger the effective toggling of instances, from background.

With each display screen (12, 14, 16) comprising the videowall (10) in the alternative embodiment, the particular instance of the batched or executable file driving a specific display screen also controls and sends or receives data from any peripheral attached to or interfacing with that particular display screen. For instance, if that particular display screen includes a camera device configured to attach to the display screen, the instance of the batched or executable file controlling content to that display screen also controls the camera or other peripheral device, and processes the signals received from the peripheral device.

The final instance of the batched or executable file running on computer (20), that is, the tenth instance in a nine-display environment, may control separate content that is displayed across all of the display screens, such as a panoramic videowall content.

Utilizing any of the above three methods, one or more individual display screens, or all of the display screens, or parts thereof, can immediately transition out of the video wall display and be utilized for specific, individualized purposes. For example, if the video wall is displayed in a "fast food" or quick-service restaurant (QSR), all of the displays may work together to broadcast a commercial or panoramic video customized to the particular venue. When a user or customer steps up to one particular display and touches it, that individual display seamlessly transitions away from the video wall to a menu or ordering environment, in which the user can interact with that particular display screen to order food. The remaining display screens comprising the video wall also may transition to the interactive ordering environment, or may continue to display the panoramic video.

If a second user or customer steps up to another video display, then that particular display also may seamlessly transition away from the video wall to another menu or ordering environment, such that two display screens are displaying and running menus and/or ordering content, while the remaining display screens of the video wall continue to display the panoramic video.

If a third user or customer steps up to yet another display screen, then that particular display also may seamlessly transition away from the video wall to another environment. For instance, if the third user is a child, then the third display screen may activate a gaming environment to allow the child the play a video game while his or her parent orders food at another display screen. As these particular display screens provide individualized content, the remaining display screens of the video wall also may transition to an interactive environment, or may continue to display the panoramic video.

The multi-panel video wall (10), such as that shown in FIG. 1, also may be include a so-called "Easter egg," region (28) on one or more display panels (12, 14, 16), in which a user may touch or otherwise engage with to display a separate panoramic video across all of the display screens and/or a separate interactive user experience on one or more stand-alone display screens (12, 14, 16). Specifically, when a user touches or otherwise engages with the Easter egg (28), the front-end software (e.g., React or Electron application) pulls a separate set of instructions from the back-end software (e.g., Drupal, Symphony), which accesses a separate database (e.g., SQL, NoSQL, or other database), thereby allowing a separate panoramic video presentation and/or separate interactive user experience to be displayed on one or more, or all, of the display screens (12, 14, 16).

As shown in FIG. 1, the Easter egg (28) may be located on any one display screen (12, 14, 16) and be used to launch a separate panoramic video across all of the display screens of video wall (10). In this manner, a user (who likely is a custodian or administrator of the video wall) can toggle the video wall (10) from one panoramic video presentation to another panoramic video presentation. This may allow users to toggle between multiple panoramic video presentations, or between a plurality of advertisements, as examples.

As shown in FIG. 4, one or more of the displays screens (12, 14, 16) comprising the video wall (10) may have an Easter egg (28), typically located along an outer edge of the display screen (e.g., top right corner of the screen) for launching a separate interactive user experience or database. In this manner, a user (who likely is a custodian or administrator) can toggle the individual display screen (12, 14, 16) from one stand-alone interactive user experience, such as a quick-service restaurant (QSR) ordering environment to a gaming environment, as examples. This may allow users to toggle through multiple interactive user experiences on the fly.

The employment of separate interactive user experiences or databases also may be based on a particular timing or sequence, which may be initiated by a timing algorithm or may be tied to an initiating event. For instance, a video wall (10) at a sports arena may be configured to executive and display content from a first interactive user experience or database up through a predetermined time, such as the fourth quarter of a game, at which point the video wall (10) is configured to launch a second interactive user experience or database. Alternatively, the second interactive user experience or database may be launched upon the satisfaction of a predetermined condition, such as the scoring of a certain number of points by one of the teams, or a certain spread between the opposing teams' scores.

As shown in FIGS. 5A and 5B, one of more display screens (12, 14, 16) of the multi-panel video wall and system of the present invention additionally may be configured with one or more peripheral devices, such as a camera (30) (e.g., 02-series webcam), a credit card or magnetic strip reader (32) (MSR), a 2-D bar code reader (34), near field communication and/or radio frequency identification (RFID) reader and/or radio frequency (RF) beacon, finger print reader, EMV (i.e., Europay, Mastercard, Visa) cradle, speech or voice recognition device, a Leap Motion, Inc.'s Leap Motion® controller or similar infrared proximity sensors or motion detection devices, a Bluetooth® beacon, a printer device for printing customer receipts, among many other peripherals. Camera (30) and a combination MSR (32) and bar code reader (34) are shown in FIG. 5 for exemplary purposes, but any of these peripheral devices may be connected to one or more display screens (12, 14, 16), the input of which may be received by the display screens and/or computer (20). Many of these peripheral devices connect with USB or similar ports located on the top, bottom, and/or sides of the display panels (12, 14, 16), and such a port provides power to the peripheral as well as a data connection. Computer (20) may update or modify the panoramic video presentation and/or one or more stand-alone interactive user environments based on input or data received from a peripheral device, such as will become readily apparent to those of skill in the art based on the examples that follow. Alternatively, the computer (20) may use one or more peripheral devices to identify the user or characteristics of the user (such as age) and restrict or limit video content to that user.

A credit card or MSR (32) may be connected to one or more display screens (12, 14, 16) for allowing a user to pay, such as with an ordering interactive user environment in a quick-service restaurant (QSR) or with a banking or automatic teller environment. Alternatively, near field communication and/or RFID or EMV cradle peripherals may be connected for receiving payment.

A bar code reader (34) may be connected to one or more display screens (12, 14, 16) for allowing a user to scan a bar code, such as that which may be found on an article of clothing, product, or item of food (such as a UPC symbol), or may be found on a government-issued identification card, such as the bar code on the back of a state driver's license. This functionality may be helpful in facilitating certain interactive user environments, such as an on-premise gambling environment.

Camera (30) may be connected to one or more display screens (12, 14, 16) for allowing a user to take digital photographic images, such as a "selfie" or self-portrait. Camera (30) also may be configured to operate with facial recognition software, which may be configured to discern certain characteristics of the user. For example, the facial recognition software may be used for security purposes, to identify the user and then provide that user with certain access based on predefined security clearances. Such an application may be beneficial to a building security system, in which one or more display screens (12, 14, 16) are configured to recognize individuals via camera (30) cleared to access the building, and then are provided access to the building upon recognition. As another example, the facial recognition software may be used for restricting access to certain content displayed on one or more of the display screens (12, 14, 16), such as restricting children from accessing gambling interactive user environments. As yet another example, the facial recognition software may be used for customizing the content displayed on one or more of the display screens (12, 14, 16), or across the entire video wall (10), based on the age, ethnicity or race, and/or gender of the user, as determined by the facial recognition software via camera (30). As one specific example, a video wall (10) located in a sports arena could use facial recognition to determine general characteristics of the audience (such as age, race, and/or gender) and then customize the panoramic video presented across the entire video wall (10) and/or the individual content delivered to one or more display screens (12, 14, 16) based on the input received from the camera (30) and the facial recognition software.

One of more camera (30) also may be used to scan or track human characteristics such as facial recognition or eye tracking, as examples, or to scan a QR code or similar from a user's smart phone or from a card or other indicia presented by the user. Alternatively, a plurality of cameras (30) may be employed, for use with tracking, identifying, and/or interacting with multiple users. For instance, a first user may interact with a particular display via a first camera (30), such as by tracking that user's eyeball movement to navigate through menu options or select certain content displayed on the panel. At the same time, a second camera may facilitate the interaction of a second user with another panel of the video wall.

One or more of the peripheral devices may be used to identify the user, or characteristics of the user (such as age, race, and/or gender), and customize video content to that user accordingly. For instance, a user may present certain credentials, such as an ID badge or card, to a particular peripheral device, and the computer (20) then selects certain video content or an interactive environment to present to that user based on identification of the user or certain characteristics about the user. As one example, a user may need to present a government ID to the video wall (10) in order to gain access to certain content, and the ID would be read by a bar code scanner (34) or a magnetic stripe reader (32). Access to content may be based on the user's security or clearance level within an organization, and the video wall (10) recognizes the user based on an RFID badge using an RFID reader and/or radio frequency (RF) beacon, or by fingerprint using a fingerprint reader connected to the videowall. In this configuration, a user is presented video content or an interactive environment, or restricted from certain content, based on presets or administrative rights set by an administrator of the computer (20) and/or video wall (10). Alternatively, computer (20) may pull content from separate remote databases, depending on the user interacting with the video wall (10). Video wall (10), alone or in tandem with computer (20), may recognize or identify users via any of the peripheral devices connected to the video display screens, including, but not limited to: bar code scanner (34) to read a bar code on a user ID or other card; magnetic stripe reader (32) to read a magnetic stripe on a user ID, credit card, or other card; RFID or near field communication device to read an RFID chip or badge or other devices capable of near field communication, such as smart phones; Bluetooth® communication, such as utilizing a Bluetooth® beacon to interact with a user's smart phone; low-energy Bluetooth®, such as an external Raspberry Pi® module; and facial recognition and/or fingerprint scanners, to detect certain physical characteristics of the user. Those of skill in the art will appreciate that other such technologies may be employed or developed which may permit video wall (10) and/or computer (20) to identify or detect a user or certain characteristics (such as age, race, and/or gender) relating to that user.

Video wall (10) may include a pop-up virtual keyboard. For instance, if a user desires to provide specific information to one or more applications running on the video wall, the user can activate a pop-up virtual keyboard by touching or tapping on a field displayed on the wall. At the instance that the user taps on a portion of a particular display screen, that display screen, displays a standard QWERTY keyboard, which the user can enter letters by touching or tapping on the desired letters.

Video wall (10) also may be configured to work in tandem with a virtual reality goggles or glasses (e.g., Google® Glass® virtual reality glasses), such that a user wearing the virtual reality goggles or glasses may see aspects of the video wall in the virtual reality glasses, or may following along remotely with another user interacting with a video wall (10).

Video wall (10), alone or in tandem with computer (20), also may employ speech recognition and speech recognition devices to interact with a user and deliver customized video content or an interactive environment based on a user's speech commands. For instance, video wall (10) may be interconnected with an Amazon® Alexa® network hub, which is capable of receiving input from a user via speech commands and then conducting an Internet search and/or retrieving information via an Internet connection for presentation to the user. In this configuration, a user may be able to request that the speech recognition device, such as an Amazon® Alexa® hub, retrieve and display certain video content or an interactive environment on the video wall (10). Specifically, a user may use certain speech commands (e.g., "Alexa, show me Stonehenge"), and the speech recognition device would retrieve from a remote database via an Internet connection and then display on the video wall (10) certain video content, such as, in this particular example, a panoramic video or image of Stonehenge.

The video wall (10), alone or in tandem with computer (20), also may employ artificial intelligence ("AI") for interacting with a user to deliver customized video content or an interactive environment. For example, the video wall (10) may be in communication with open AI software, such as ChatGBT, which may be via computer (20) and/or a network connection, for interacting with and responding to a user's commands or inputs. This may present an application of the video wall (10) in which it is used as a help desk or concierge, such as at a hotel, with the AI software being configured to deliver certain functionality to users.

Video wall (10), alone or in tandem with computer (20), also may employ a motion sensor or detector, such as Leap Motion, Inc.'s Leap Motion® controller, to adjust the video content displayed on video wall (10) based on a user's hand gestures or motions. For instance, with a video wall (10) interconnected with a motion sensor or detector, such as Leap Motion, Inc.'s Leap Motion® controller, a user may be able to rotate, resize, or pan certain panoramic videos or images displayed on the video wall (10) by using one or more hands or fingers, the movement of which is captured by a motion sensor or detector (using, for instance, infrared or other proximity sensors) and relayed to video wall (10) and/or computer (20) to adjust or modify the panoramic video or image accordingly.

Video wall (10), alone or in tandem with computer (20), also may employ one or more ultrasonic or hypersonic speakers, to transmit audio to users (24, 26) in a focused beam of sound. In this arrangement, a particular user standing in front of a particular display screen may hear customized sound or audio directed to that user that would not be audible to other users located outside of the range of the ultras or hypersonic speaker. This arrangement may be helpful to provide a particular user with audio or sound relating to the individual user environment or experience, which may not be relevant to other users interacting with other display screens in video wall (10).

One of more ultra or hypersonic speakers may be incorporated or integrated with individual display screens (12, 14) of the video wall (10). For instance, in a video wall (10) comprising 9 display screens, the video wall may have 9 different sets of ultra or hypersonic speakers, each one positioned or located with respect to a separate display screen as necessary to reach a particular user positioned in front of such display screen. Speakers may be incorporated into the display screen, or may be a separate component operatively connected with the display screen. For instance, speakers may have USB connections suitable for interconnection with the USB port of a display screen, as described above with respect to other USB components or peripheral devices.

While those skilled in the art may appreciate that many different speakers may be incorporated with or integrated within one or more display screens (12, 14), one exemplary ultra or hypersonic speaker that may be suitable for interconnection with one or more display screens of video wall (10) includes the Soundlazer® Model #SL-01 open source parametric speaker.

Figure 8:
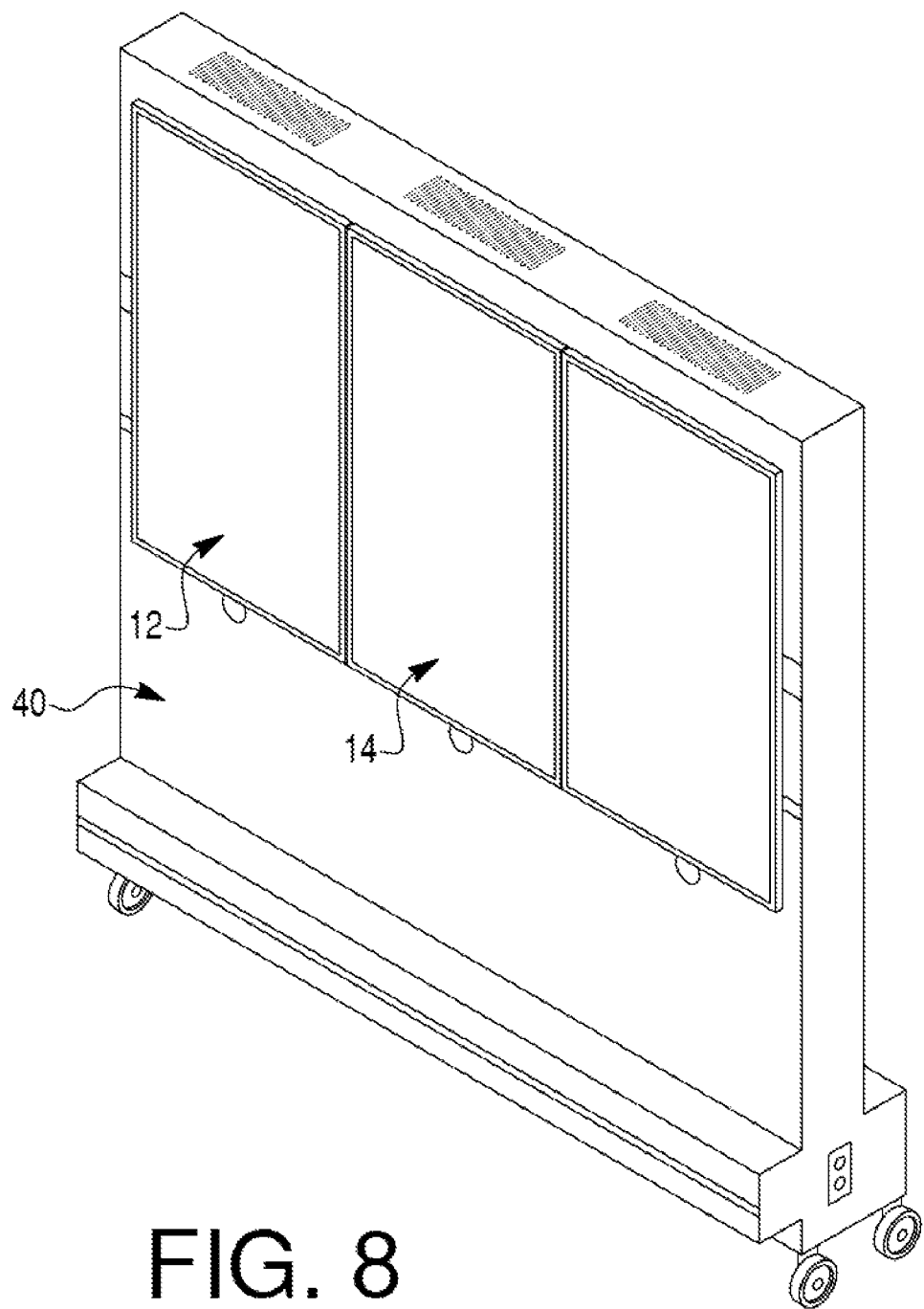
FIG. 8 depicts an exemplar multi-panel video wall system, similar to that generally shown in FIG. 1, as configured for use on a mobile cabinet.
Figure 9:
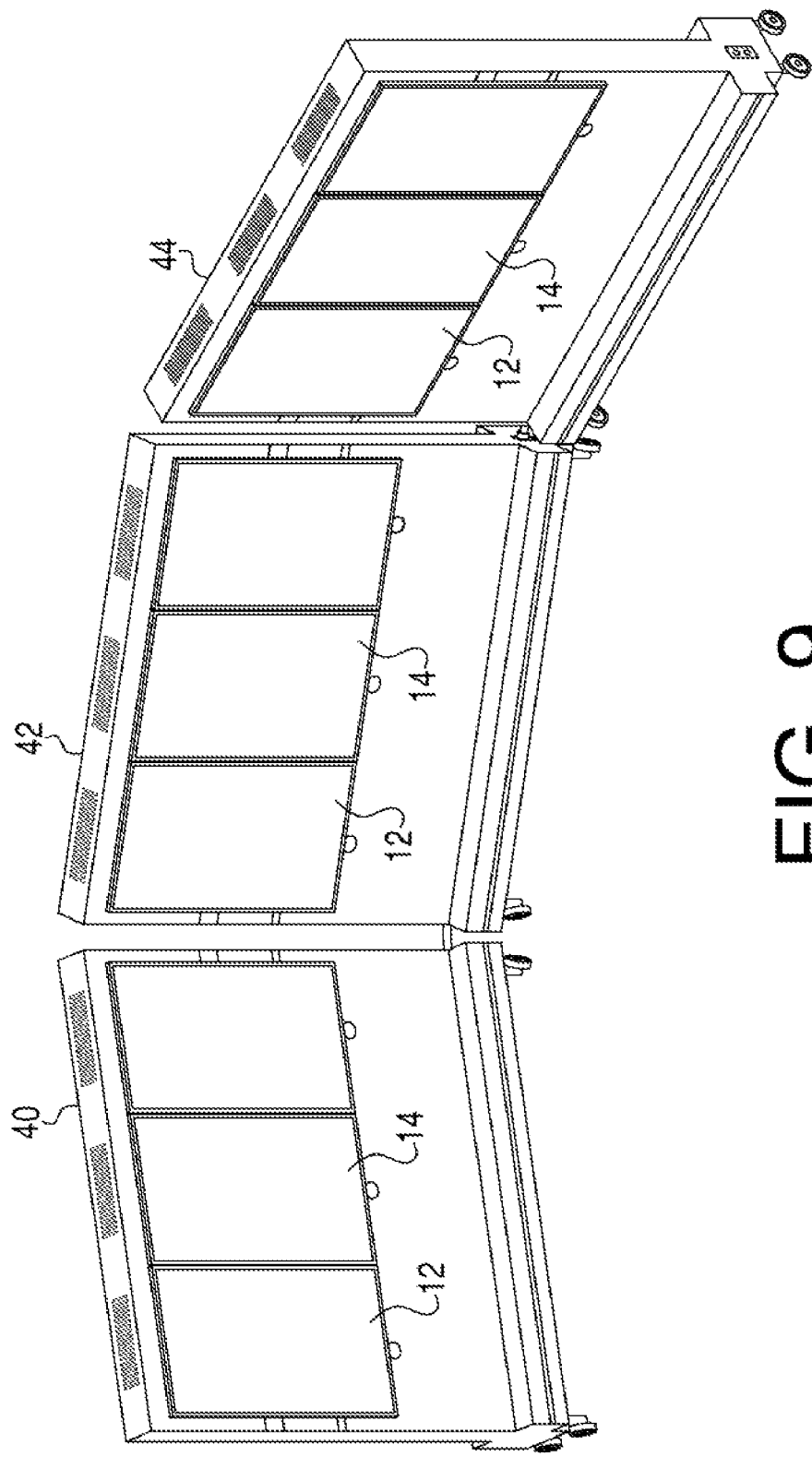
FIG. 9 depicts the exemplar multi-panel video wall system of FIG. 8 when a plurality of mobile cabinets, in this instance three cabinets, are connected to one another.

As shown in FIGS. 8-9, the video wall (10) system of the present disclosure may be configured for use in a mobile setting. For instance, as shown in FIG. 8, the video wall (10) may be comprised of a plurality of display screens (12, 14) mounted to a cabinet (40). As shown in FIG. 8, three display screens are mounted side-by-side together on the cabinet (40), each display being positioned in a portrait orientation; however, one skilled in the art would appreciate that any number of display screens may be mounted on a cabinet, depending on the size of the cabinet and the size and placement of the displays. The cabinet (40) is mounted on casters or wheels to allow for the cabinet (40), together with the displays (12, 14) mounted thereon, can be easily transported or moved around. This may be advantageous to a user desiring to move the cabinet (40) room to room, such as from one classroom to another at a school, or to different geographic locations, such as in the context of a set that moves between trade shows, theatrical presentations, musical concerts, and the like. The cabinet (40) is prewired with electrical and data connections for supporting the display screens (12, 14), and contains a computer or central processor for providing content to the display screens. The data connections may be an HDMI or USB connection, though may be any suitable wired or wireless connection.

As shown in FIG. 9, two or more cabinets may be coupled or connected together to create an even larger mobile video wall. As shown specifically in FIG. 9, three cabinets (40, 42, 44) are connected to one another to form a larger video wall. With three cabinets (40, 42, 44) connected together, each cabinet hosting three displays, a video wall of nine or more display screens quickly can be configured. Each cabinet is prewired with an electrical and a data connection, and each cabinet can be plugged in one to the next to allow the display screens on multiple cabinets to be interconnected. In a mobile setting as shown in FIGS. 8-9, a mini PC or similar computer (20) may be ideal for portability. One example of such a computer (20) that is smaller in size but still provides adequate capability to power the video wall is an Intel® Nuc® mini PC.

Figure 10:
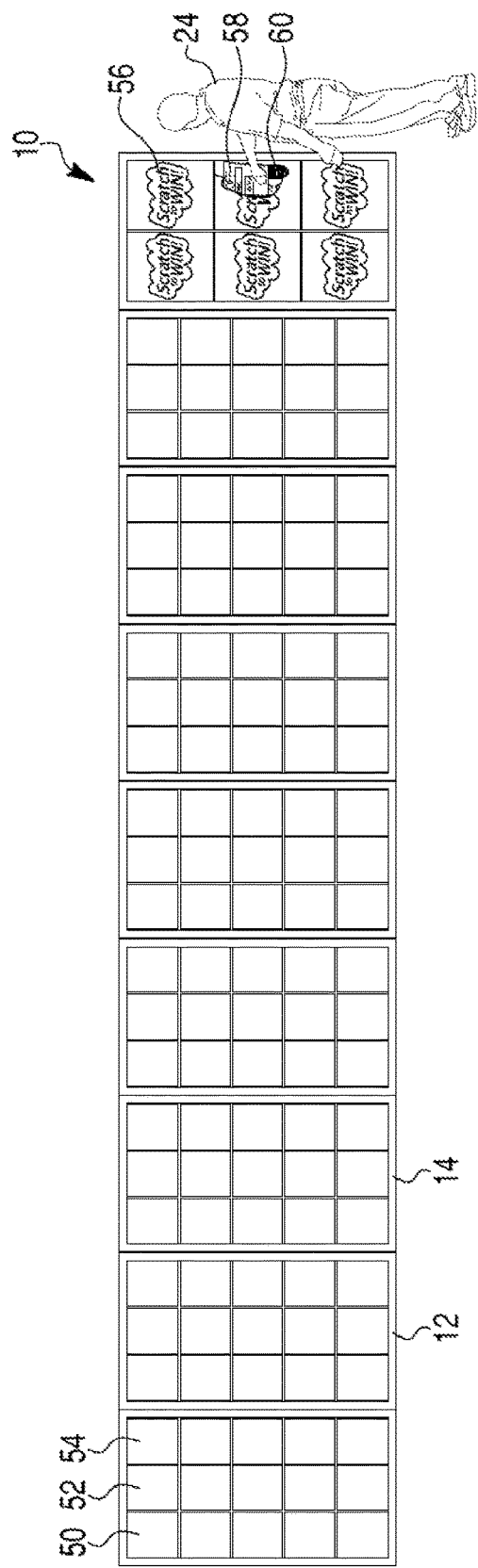
FIG. 10 depicts an exemplar multi-panel video wall system, in which one or more groups of panels display one configuration of content.

As shown in FIG. 10, the video wall (10) may have individual displays (12, 14) subdivided into a plurality of tiles, such as the tiles (50, 52, 54) shown in FIG. 10. In this configuration, as shown in FIG. 10, tiles may be arranged in a series of five rows per display, with each row comprising three tiles, wherein each tile displays independent content, when the displays (12, 14) are configured for the interactive user environment.

As further shown in FIG. 10, the individual interactive user environment tiles (such as that shown at reference numerals 50, 52, 54), may be further configured for use with a "scratch-off" application whereby a person (24) uses a finger, stylus, or the like to "scratch off" a top layer (56) of the content displayed in the tile. By interacting with the tile in this manner, the person (24) reveals a hidden layer (58) of content, which may be an advertisement or coupon having a QR code (60) that the person (24) may scan with a smart phone to redeem a prize, discount, giveaway, or the like.

Figure 11:
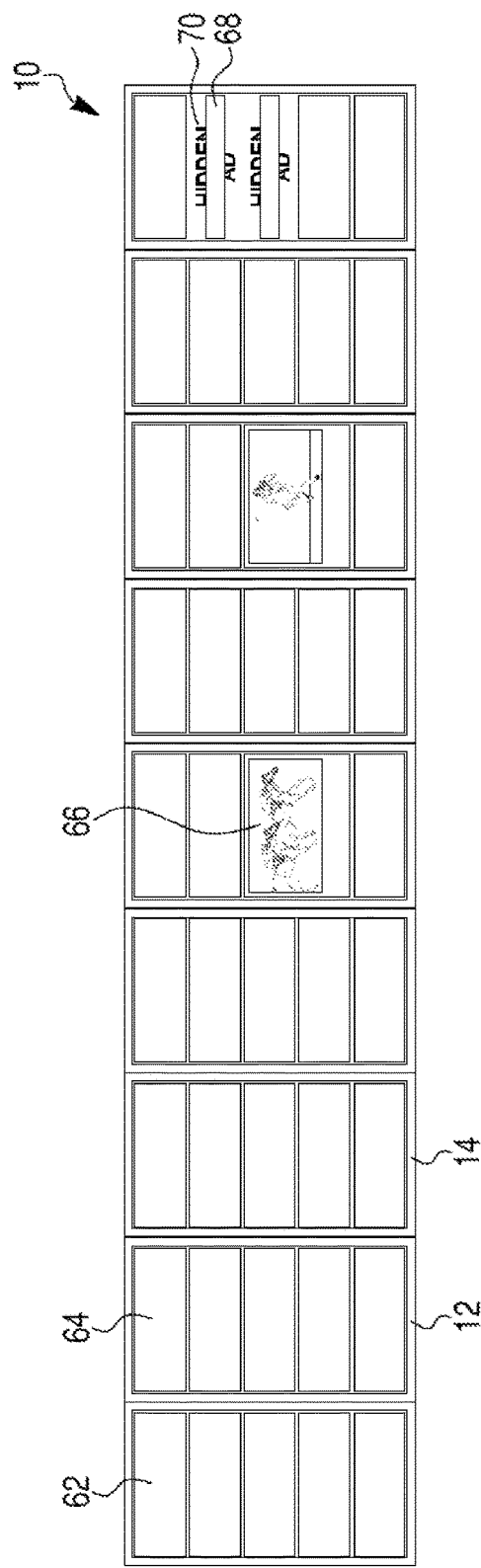
FIG. 11 depicts an exemplar multi-panel video wall system, in which one or more groups of panels display another configuration of content.

As further shown in FIG. 11, the individual displays 12, 14 of the video wall (10) may be subdivided into full-width interactive user tiles (such as that shown at reference numerals 62, 64). In this configuration, as shown in FIG. 11, tiles may be arranged in a series of five rows per display, with each row comprising an interactive user environment tile (62, 64) that spans most or all of the width of the display. This wider configuration allows for the display of greater content per tile, which may accommodate, among other things, live stream video, such as a live broadcast or content provided by a streaming service, as examples, as shown at reference numeral 66. While the interactive user tiles (62, 64) may be static, constantly displaying the same content, such as an advertisement, the tiles also may rotate or flip over (as shown at reference numeral 68) to reveal secondary content, or, as shown at reference numeral 70, a third row of content, or hidden content, that is briefly revealed while the interactive user tile (62, 64) rotates.

Figure 12:
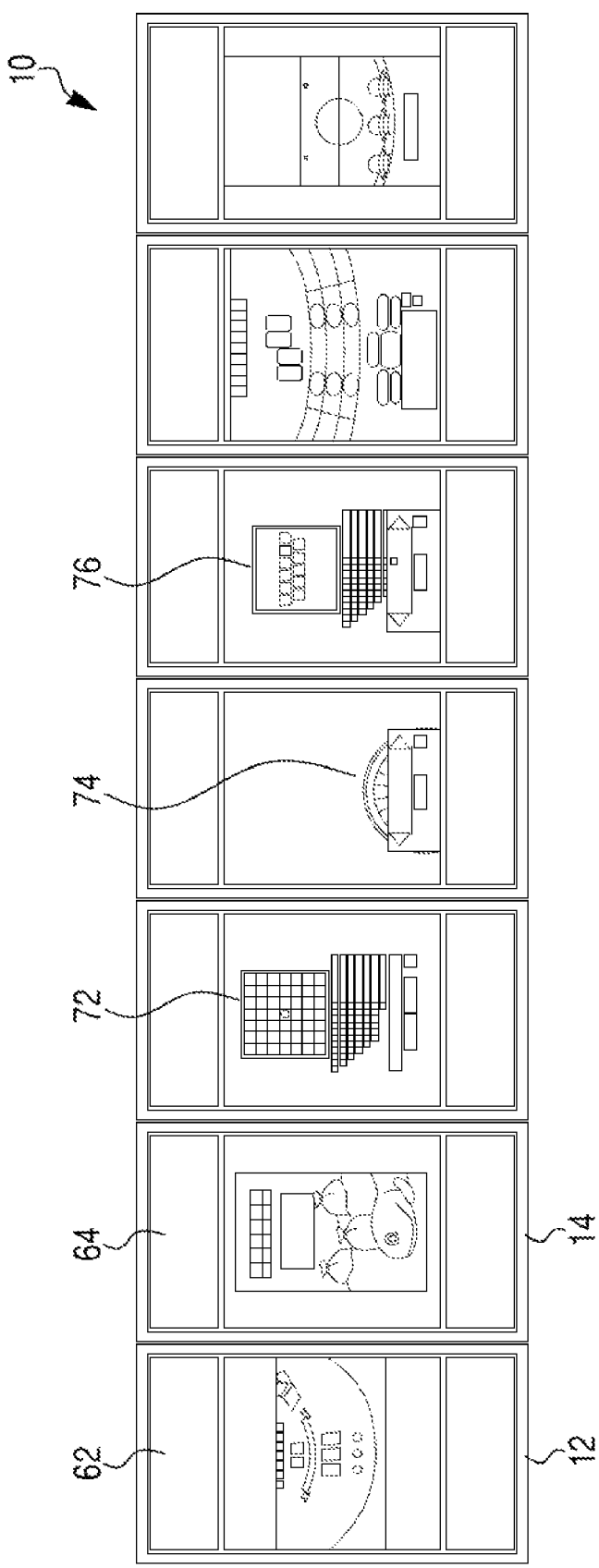
FIG. 12 depicts an exemplar multi-panel video wall system, in which portions of one or more groups of panels display entertainment venue information and ticketing options.

As shown in FIG. 12, the displays (12, 14) of the video wall (10) may be configured to have interactive user tiles of differing sizes, such as standard sized tiles (62, 64) for presentation of static content such as advertisements and larger sized tiles (72, 74, 76), which may be three or four times larger, for presentation of dynamic content such as video games, live or streaming video content, or websites or applications such as TicketMaster® or OpenTable® entertainment venue and restaurant booking services.

Figure 13:
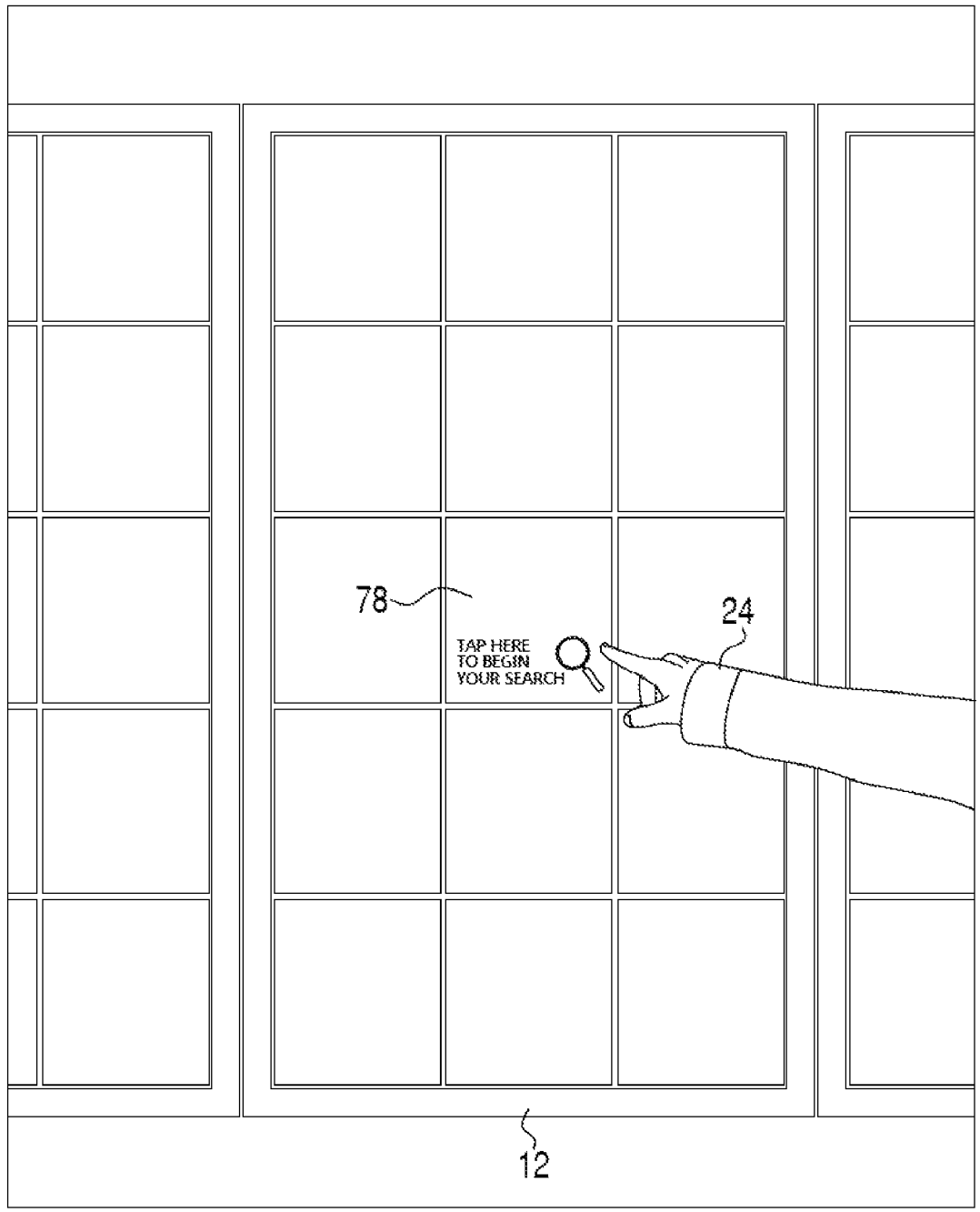
FIG. 13 depicts a portion of an exemplar multi-panel video wall system, in which one aspect of a panel provides for search engine capabilities.
Figure 14:
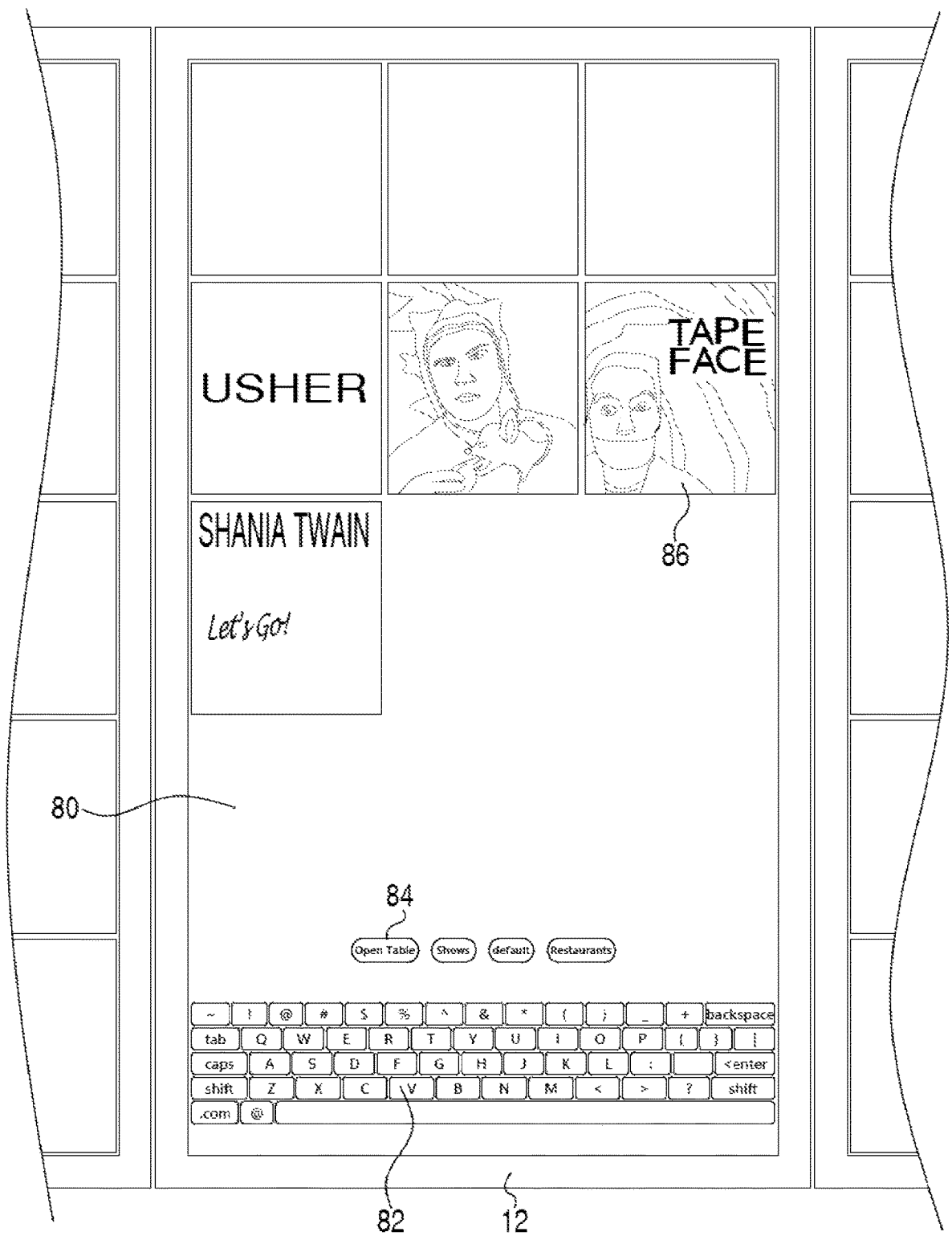
FIG. 14 depicts a portion of an exemplar multi-panel video wall system, in which another aspect of a panel provides for an on-screen keyboard and connectivity and interactivity with online services.
Figure 15:
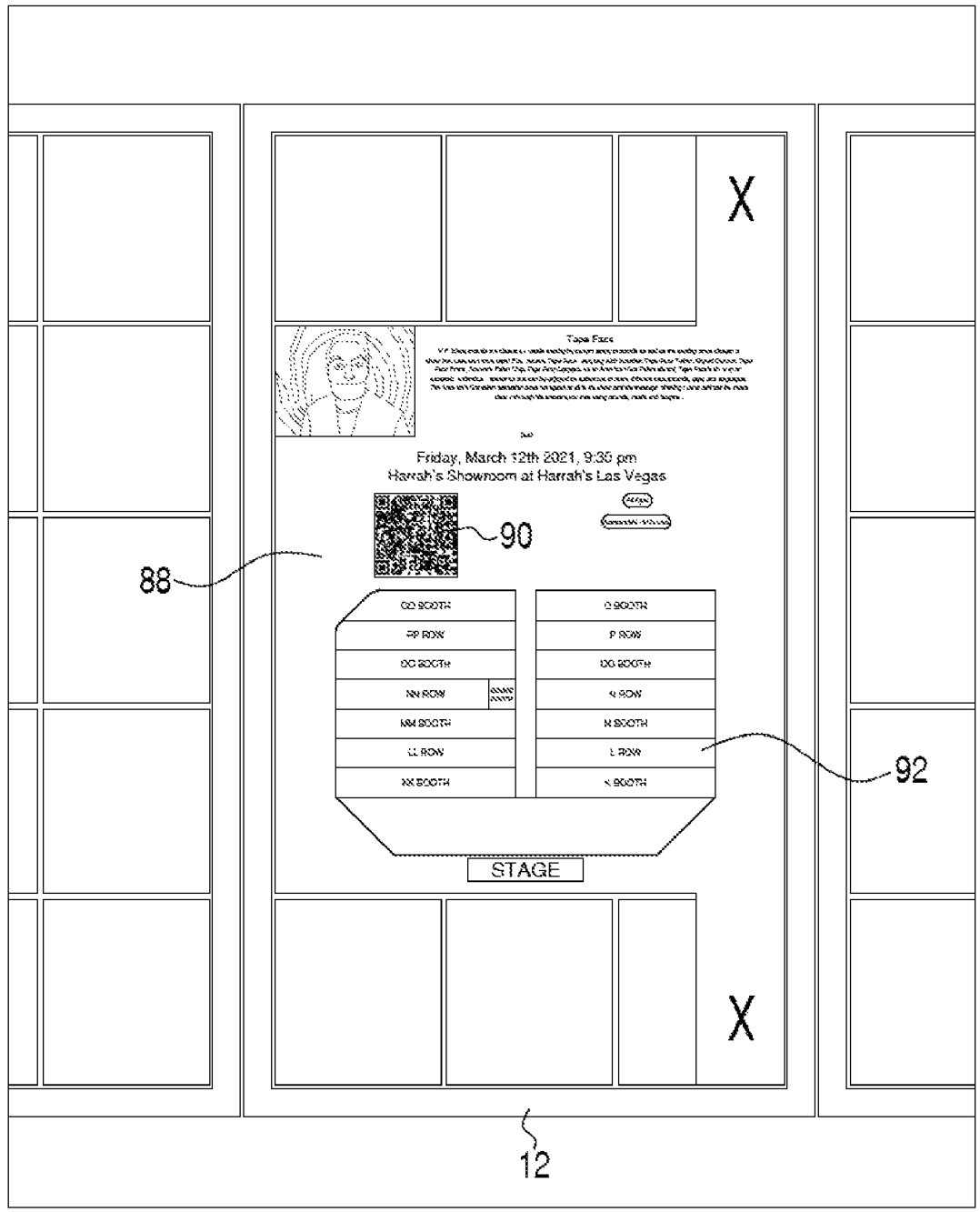
FIG. 15 depicts a portion of an exemplar multi-panel video wall system, in which yet another aspect of a panel provides for entertainment venue information and ticketing options.

As shown in FIG. 13, the interactive user environment of a display (12) may provide for an interactive user tile centrally located, such as that shown at reference numeral 78, for facilitating search engine capabilities. For instance, a person (24) desiring to search for tickets to a concert or reservations for dinner, as just two examples, may tap or otherwise engage with the tile (78) shown in FIG. 13 to launch a search engine screen, such as that shown at reference numeral 80 in FIG. 14. As shown in FIG. 14, the search engine screen (80) projects over a dominant portion of the display (12) to facilitate the person's search by providing an on-screen keyboard (82) to allow the person to provide inputs, such as the concert or performance that he or she wants to view or the restaurant where he or she wants to dine. Specific searching capabilities or search engines or sites may be launched by tapping on the on-screen buttons, such as that shown at reference numeral 84 for the OpenTable® restaurant booking service. By tapping on button (84), the person 24 may access the online service and then use the on-screen keyboard (82) to enter specific information. Based on the person's inputs, the search screen (80) delivers to the person (24) a plurality of search results (86) that the person may select for further information. Selecting on a search result launches a search result screen, such as that shown at reference numeral 88 in FIG. 15. A person (24) discovering the search results screen (88) is provided with additional information relating to the search result, such as, for instance, ticketing options for concerts or performances, or reservation information for restaurants, as examples. The search results screen (88) may provide the person (24) with a QR code for scanning with a smart phone to continue the process of booking tickets or securing reservations on the smart phone, such as by launching applicable TicketMaster® or OpenTable® booking applications, as examples. On the video wall (10), the person (24) may be presented with availability options, shown at reference numeral 92, for selecting seating at an entertainment venue or at a restaurant, as examples.

Figure 16:
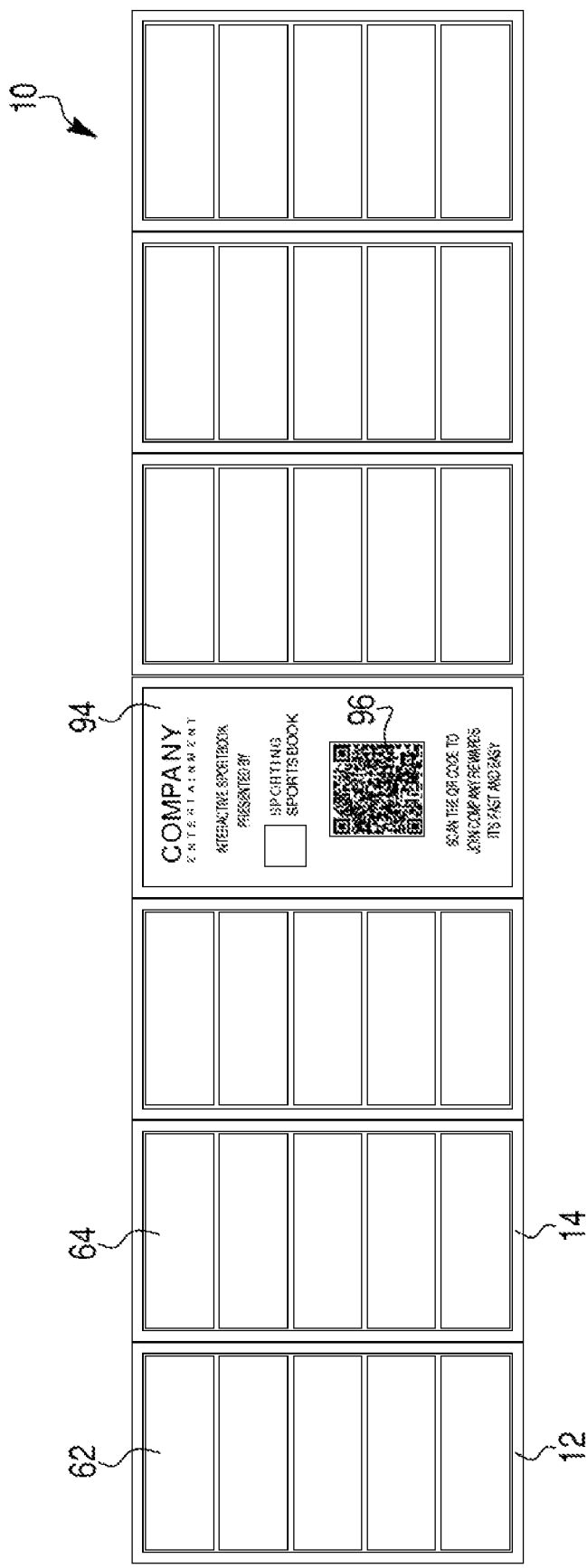
FIG. 16 depicts an exemplar multi-panel video wall system, in which one or more groups of panels display yet another configuration of content.

As shown in FIG. 16, the video wall (10) may be configured such that one display (12, 14) projects full-screen content (as shown at reference numeral 94), such as full-screen advertisement, which may be relevant to the content displayed on the adjacent displays of the video wall. The centrally-located display (12, 14) projecting full-screen content (94) may include a QR code (96) or the like to allow a person (24) to scan the code and continue the experience on his or her smart phone, such as the continuation of any application that may be displayed on the video wall (10).

The video wall (10) may customize the content of the interactive user environment to a specific user upon detecting the identity of the user. Detection of a user's identity may be accomplished by one or more of the peripherals interconnected with the video wall (10). Detection of a user's identity may be automatic, such as if a user has a smart phone or ID badge configured to interact with near-field communication, Bluetooth® communication, or the like. Alternatively, the user may log onto the video wall (10) by signing into an account or providing the video wall with some aspect of the user's identity. Once the user has been identified, the video wall (10) is configured to customize content for that individual user based on any set of demographical information and/or based on any accounts that the user may have set up that is accessible by the video wall.

One specific example, in the context of a student interacting with the video wall (10) in a university setting, the user may log on to the video wall, or otherwise be identified by the video wall, and the video wall accesses certain student information to customize the interactive user environment for the user. For instance, the video wall (10) may provide for the student to log onto a student account with the university, and the video wall pulls certain data pertaining to the particular user from a customer relationship management (CRM) database managed by the university, such as many popular CRM software suites such as Slate®. This can be accomplished by an application programming interface (API) or other communication protocol between the video wall (10) and the host's CRM. While this is described with specific reference to a university CRM, it could be just as readily facilitated by an employer database or any other database, wherein the video wall pulls certain data relating to the user from an API to a remote database in order to customize content displayed to the user.

Figure 17:
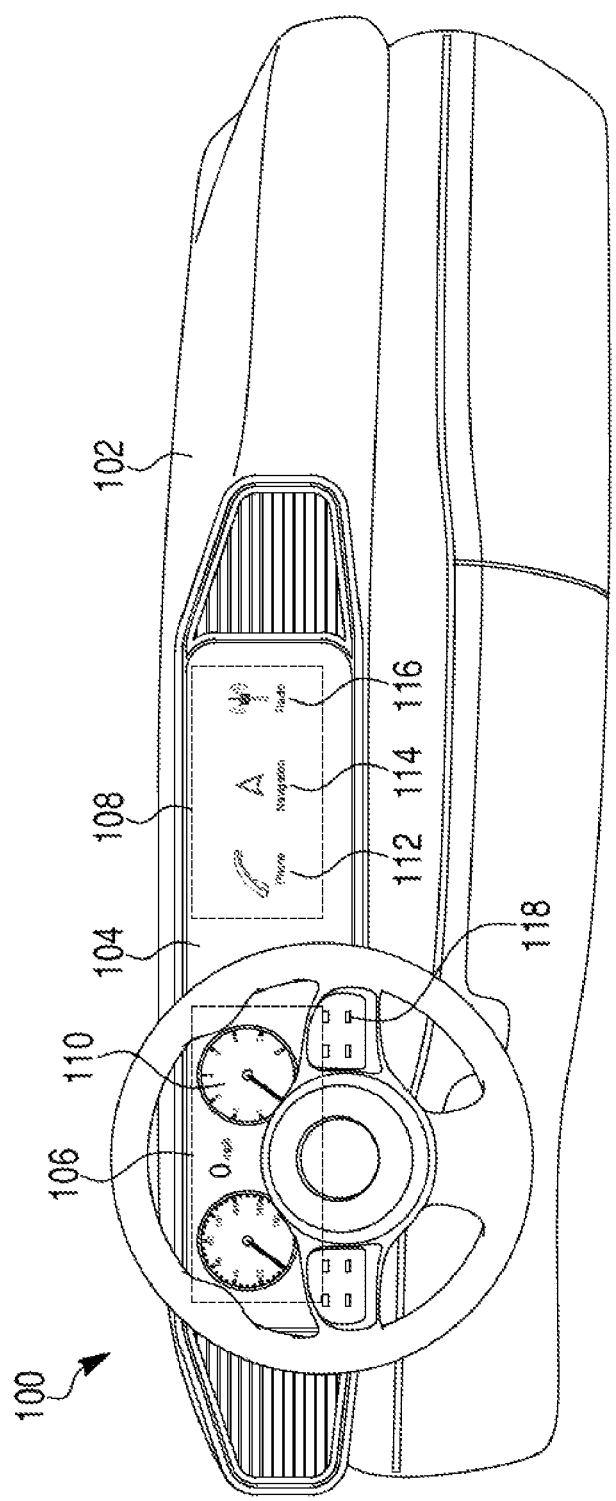
FIG. 17 depicts an exemplar video wall system, in which one or more groups of panels are configured for use in a vehicular environment in a location such as a vehicle dashboard.

As shown in FIG. 17, another embodiment of the video wall (100) may be configured for use in a vehicular environment, such as part of the dashboard of an automobile, or provided for back-seat passengers, or as part of the instrument panel of an aircraft, among other examples. As shown in FIG. 17, the video wall (100) is installed in or on the dashboard (102) of an automobile. The video wall (100) may be comprised of one or more display modules, panels, screens, or tiles. Alternatively, as shown in FIG. 17, the video wall (100) may be comprised of one large display panel (104) that spans a significant length of the dashboard (102) and is segmented, internally or otherwise, to have different display regions (106, 108). Alternatively still, the display regions (106, 108) may be comprised of separate display panels located immediately adjacent to one another.

In a default setting, the video wall (100) shown in FIG. 17 may be configured to show a continuous content that extends across the entire display, which may show an instrument panel (110) or information pertinent to the operation of the vehicle. In the default setting, the video wall (100) also may show other certain content relating to features or components of the vehicle, such as a phone or Bluetooth® connection (112), navigation or GPS (114), or a radio or other media source (116).

Upon a user's interaction with the video wall (100) shown in FIG. 17, which may be accomplished by a user touching a portion of the display, the default content may seamlessly transition to an individual user environment, depending on where the user interacted with the video wall. For example, if the user touches on an area such as the navigation component (114), the entire video wall (100) may seamlessly transition from the default video content to a stand-alone menu relating to the navigation software, allowing a user to select a destination or observe information about the current location. As another example, selecting on another component, such as the radio (116), may cause the video wall (100) to seamlessly transition from the default content to a separate menu for radio or media settings.

A user may interact with the video wall (100) shown in FIG. 17 by touch, with the display (104) or internal display regions (106, 108) having touchscreen capabilities or similar capabilities for a user to control the display of video content. Alternatively, the user may interact with the display (104) via a spin dial, touch dial, trackpad or other control mechanism (118) located on the steering wheel or elsewhere in the vehicle. Alternatively still, the user may interact with the video wall (100) by using a smart phone or other mobile device, which executes an application or app to control certain functionality on the video wall (100), the smart phone or other mobile device communicating with the video wall (100) via a cellular or Bluetooth® or other wireless connection.

Figure 18:
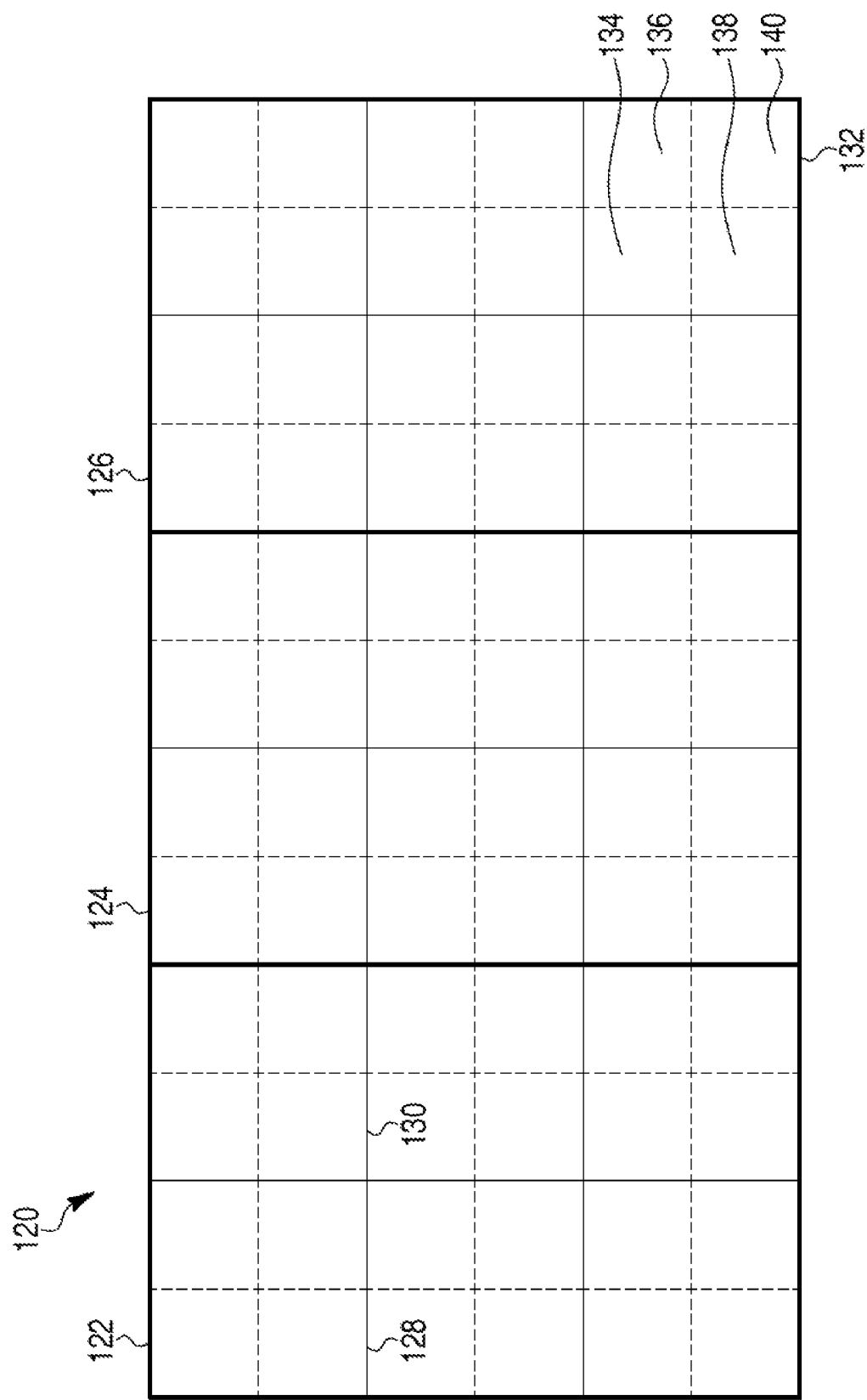
FIG. 18 depicts an exemplar video wall system, in which one or more groups of panels are composed of a plurality of light emitting diode tiles interconnected with one another to form a continuous display surface.

As shown in FIG. 18, another embodiment of the video wall (120) is composed of a plurality of light-emitting diode (LED) panels (122, 124, 126). While FIG. 18 depicts three LED panels (122, 124, 126), it is important to note that the video wall (120) may be composed of fewer or more LED panels, depending on the application and/or display area. The LED panels (122, 124, 126) are positioned adjacent to one another and may be attached to one another and/or attached to a common backing, such as a wall or a railing or similar mount.

Each LED panel (122, 124, 126) is composed of a plurality of LED tiles (128, 130, 132). While FIG. 18 depicts each LED panel (122, 124, 126) being composed of six LED tiles (such as that identified by reference numerals 128, 130, 132), it is important to note that the LED panels (122, 124, 126) may be composed of fewer or more LED tiles as may be required by the application and/or display area. Each of the LED tiles (such as that depicted by reference numerals 128, 130, 132) fit and attach together much like jigsaw puzzle pieces to form a continuous surface for displaying video.

Each LED tile (such as, for instance, that depicted by reference numeral 132) has four modules (134, 136, 138, 140), where are regions or spatial areas of the LED tile. While each LED tile is composed of a plurality of modules, the video content of each tile is driven by one controller.

Figure 19:
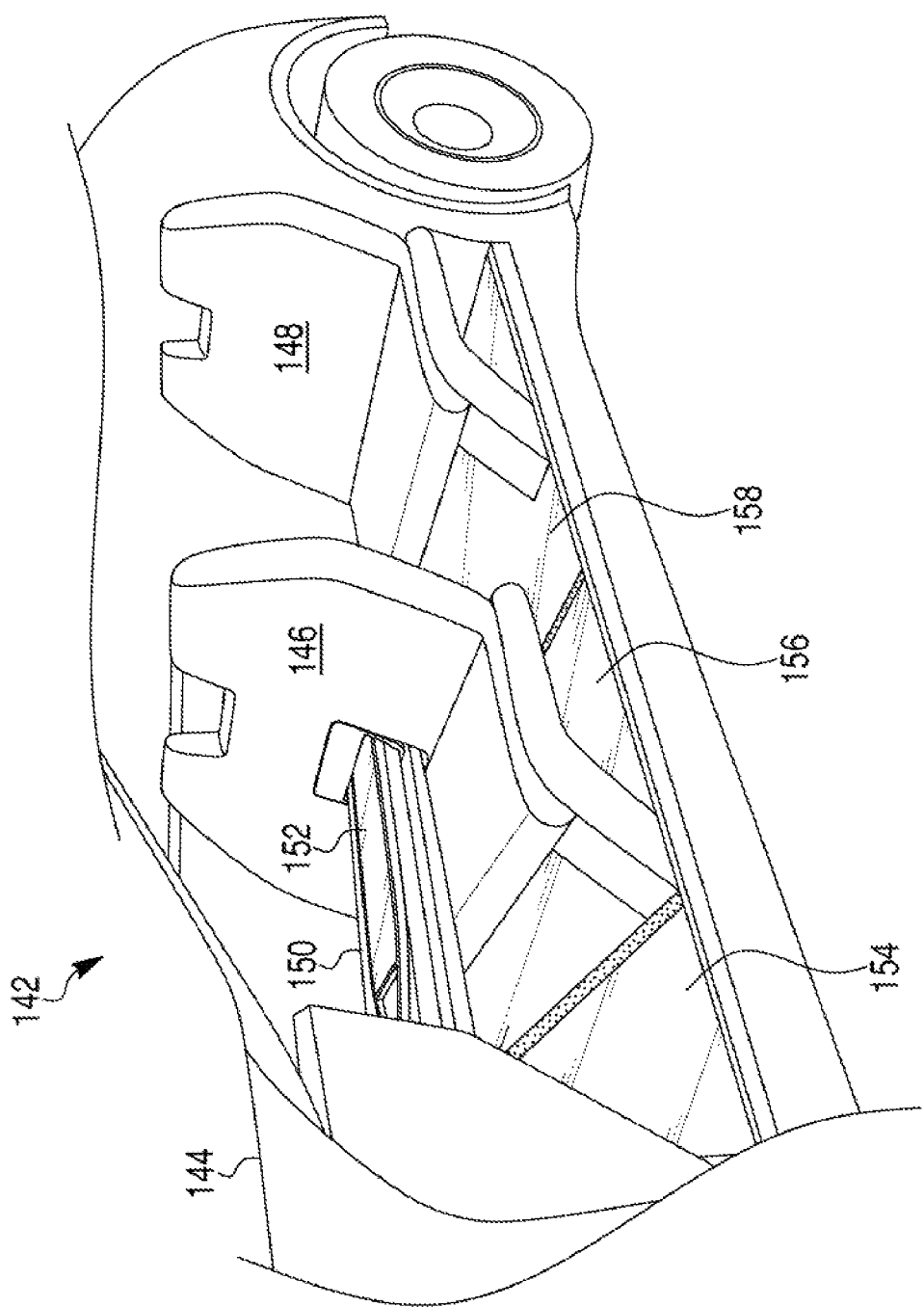
FIG. 19 depicts an exemplar video wall system, in which one or more groups of panels are configured for use in a vehicular environment in locations such as a vehicle center console and floor surface.

As shown in FIG. 19, another embodiment of the video wall (142) may be configured for additional uses in a vehicular environment, such as part of the center console of an automobile (144) having a front seat (146) and a rear seat (148), or placed on or incorporated into the floor or flooring surface, among other examples. As shown in FIG. 19, the video wall (142) is installed in or on the center console (150) of an automobile (144). The center console (150) includes a display (152) which may be comprised of one or more display modules, panels, screens, or tiles. Alternatively, or in tandem, the video wall (142) shown in FIG. 19 further includes a plurality of displays (154, 156, 158) that are mounted on or incorporated into a floor or flooring surface of the automobile (144).

In this configuration, the center console display (152) and the floor displays (154, 156, 158) may work together to display one continuous video file or may seamlessly transition to a user interactive environment to display individual and/or independent video or media content. The center console display (152) may control the floor displays (154, 156, 158), and all of the displays may work in tandem with a dashboard display, such as the video wall (100) shown in FIG. 17.

The embodiments of the video wall configured for use in a vehicular environment, whether mounted in or on or incorporated within the vehicle dashboard, such as reference numeral 120 in FIG. 17, and/or mounted in or on or incorporated within a vehicle center console display (152), the floor displays (154, 156, 158), or some combination thereof, may be controlled by a user with a finger, such as touchscreen capabilities, or may be controlled via other controls more commonly used in a vehicular environment. For example, the video content may be controlled using a spin wheel, a touch wheel, a trackpad, among other examples.

The multi-panel video wall and system of the present disclosure may be used for a variety of other business, personal, and entertainment purposes. Some non-limiting examples include restaurants such as quick-service restaurants (QSR) and bars or taverns, hotel or airline check-in environments, gaming environments, on-premise gambling environments such as at sports arenas or racetracks, automated banking teller environments, wayfinding applications and environments such as in a building or mall or on a campus, building security applications and environments, among other purposes and applications throughout the restaurant, hospitality, transportation, education, healthcare, banking, gaming, gambling, entertainment, and many other industries and markets. In each of these environments, the video wall may display a panoramic video when acting in a default or resting mode, but one or more individual display screens may seamlessly transition away from the video wall upon interaction with or detection of a customer, thereby launching a separate environment (such as an airline check-in environment) for the customer on a particular display screen.

Figure 6:
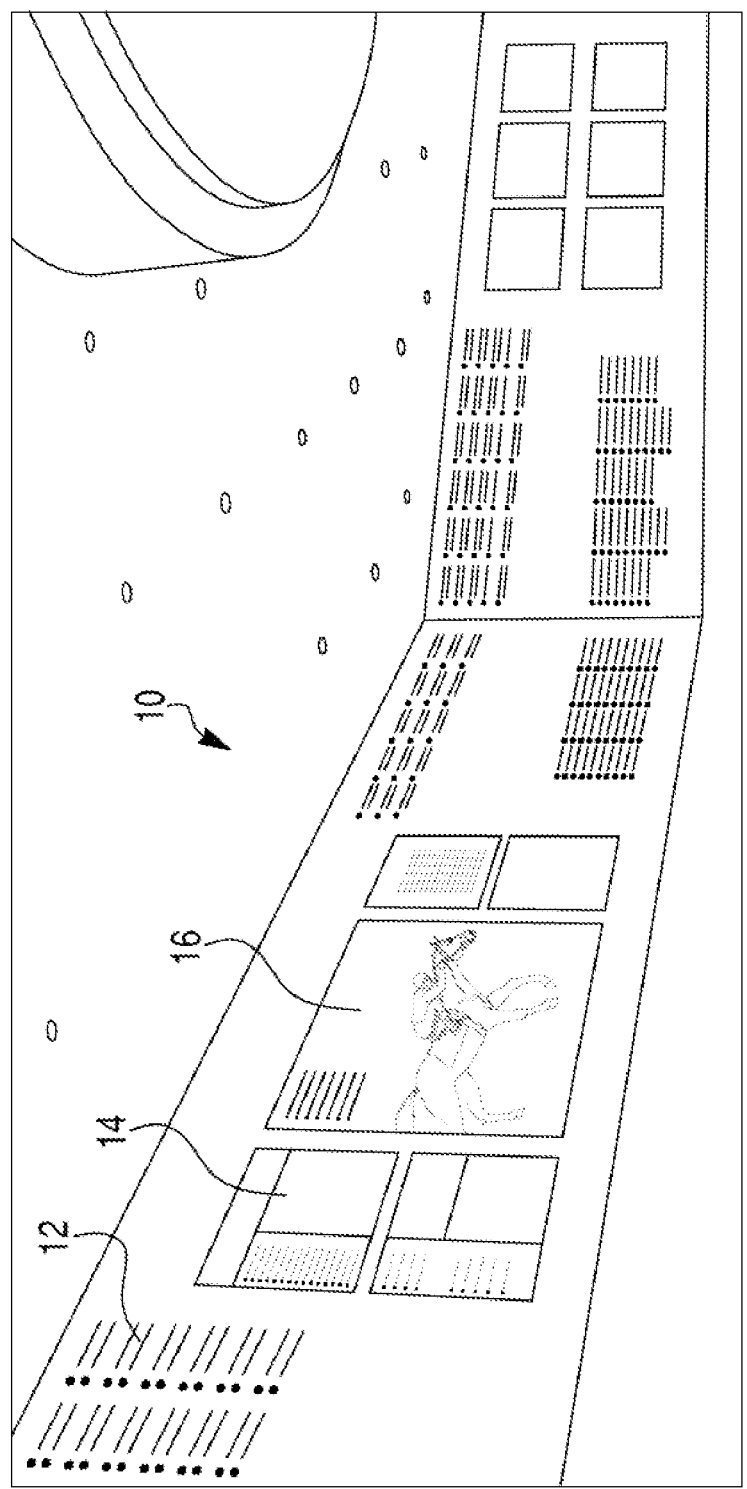
FIG. 6 depicts an exemplar multi-panel video wall system, in which one or more groups of panels are configured for use in a sports betting environment.

As one particular example, the video wall system of the present invention may be configured for use at a sports arena for on-premise gambling, as generally shown in FIG. 6. In this specific example, a video wall (10) comprising a plurality of video display screens (12, 14, 16), such as that shown in FIG. 1, may be located in a sports arena, such as along a corridor. One or more of the video display screens (12, 14, 16) may include a camera (30), configured to work with facial recognition software, as well as a payment device and/or bar code reader (32, 34). In a rest or default mode, the video wall (10) may display a panoramic video, which may be advertising such as a commercial, or may be a live camera feed of the sporting event taking place at the arena such as a basketball game. When a user desires to engage with the video wall (10), such as to engage in gambling or place a bet, the user touches or otherwise engages with the video wall, in which the video wall seamlessly transitions from the default panoramic video or live feed to an interactive user environment, where each display screen (12, 14, 16) acts as a stand-alone environment for interacting with a separate user. Camera (30) may be configured to interact with facial recognition software to determine whether the user is of minor age and prevent the child user from accessing the interactive video environment. The user may be required to scan using MSR (32) a card (e.g., a magnetic stripe or RFID card) containing gambling tokens or credits, or user identification information, in order to proceed with the interactive user environment. The user may be further required to scan using bar code reader (34) a government-issued identification card, such as a driver's license, to proceed with the interactive user environment. As another example, the user may be required to scan a QR code, or similar, from a smart phone or a card or other indicia presented by the user to the video wall, the QR or other code being read by camera (30). Upon accessing the interactive user environment, the user may be presented with options for placing bets on sporting events, such as a sports book, among other forms of on-premise gambling. The user may be able to place such bets using the interactive user environment, which the user pays for using a gaming card, tokens, or credits, and then the system may print out a receipt of the user's bets using a network or cloud-connected printer, which may be connected to the video wall (10) via a USB or similar connection, or may be located at some other place, such as a ticket counter or sports betting counter at the sports arena. Upon completion of the interactive gambling experience, or upon such timeout after the user stops interaction with the display screen, the video wall (10) seamlessly transitions back to the panoramic video presentation. The example of an interactive gambling environment may be configured for use in any number of sporting events, arenas, and racetracks, including, as yet another example, at a horsetrack environment, in which the video wall (10) supplants traditional betting windows by allowing users to engage with display screens (12, 14, 16) to place horse bets before broadcasting live footage of the horse race across the entire video wall (10).

Related to use in a gambling and other similar gaming environments, the video wall (10) system of the present invention may be configured to facilitate the pay-out of bets won, through the display to a user of, for instance, a QR code, which the user may scan. As one non-limiting example, a user may use the video wall (10) to place a bet, such as a parlay bet, by interacting with a gambling or gaming application depicted on an aspect of the wall. The user may be presented with a QR code or similar, for scanning with the user's smart phone device. Upon successful winning of the bet, the user can visit an on-site teller, who scans the QR code from the user's smart phone, which then results in a cash payout from the teller.

Use of a QR code also may facilitate a user's registration with the operator of the video wall (10) system. For example, to log onto the video wall (10) system, such as to access a gaming account, which is often the case with online gaming sites such as, for instance, "Caesar's Bets," a user may scan a QR code on the video wall using his or her smart phone, which may allow the user to log into his or her gaming account, or rewards account, using the smart phone, either by using conventional login credentials (username and password) or by using other features of the smart phone, such as an electronic key residing on the smart phone, an authenticator application residing on the phone, and/or through two-step authentication utilizing, for instance, a secret code provided via text message to the user. Once logged onto the operator's account or portal, the user may deposit funds for future bets, place bets, or receive credits or instructions for payout of prior bets won.

As an optional feature, and related to the general use of video wall (10) system with a gambling or other similar gaming environment, it may be that a single display (which may be a free-standing kiosk, or separately located display screen, tablet, or the like) is used by a user to enter betting information.

In a gambling or other similar gaming environment, a multi-display video wall (10) may be configured to display a sports book on one display or panel, with individual games displayed on subsequent displays or panels. As just one example, which is provided for illustrative purposes only, one display or panel may be used for receiving bets from a user, while another display or panel or plurality of displays or panels, such as, for instance, three consecutive displays operating together to display a single or unified content, may be configured to display a fly-out window featuring the sports event (e.g., horse race, car race, football game, basketball game, etc.) relating to that for which the user placed bets. That is, in this example, if a user provided certain bets relating to the Kentucky Derby prior to the race, then the fly-out window may play live footage of the Kentucky Derby race while it is taking place. Still other displays or panels may provide live feedback about the sporting event or the bets placed, or statistics about the bets placed.

In a gambling or gaming environment, the video wall (10) system may be configured to display information about online sports books or sports-related gaming, allowing users to monitor different online sports books at once and/or to place wagers with one or more sites while interacting with the video wall (10). For instance, the bets of "Draft Kings" or "Fan Duel" may be presented, along with other ones, such as "Caesar's Bets" or "Bet Us." A user may see all of these competing sports books at once, based on the video wall (10) ability to project substantial amounts of information at once across the entire wall. Users may be able to interact with one or more of these online gaming sites or operators in real-time, using the video wall (10) system of the present invention.

As another particular example, the video wall system of the present invention may be configured for use to provide wayfinding on a college campus. In this specific example, a video wall (10) comprising a plurality of display screens (12, 14, 16) may be located on a campus in much the same way that a map or directory may be placed. In the default or rest mode, the video wall (10) may display a panoramic video of the campus or university, or advertising such as a commercial. When a user desires to engage with the video wall (10), such as to find a building or locate a faculty member's office, the user touches or otherwise engages with the video wall, in which the video wall seamlessly transitions from the default panoramic video to an interactive user environment, where each display screen (12, 14, 16) acts as a stand-alone environment for facilitating a directory or wayfinding purposes. In the stand-alone interactive environment, a user may look up certain buildings or landmarks, or the address of a faculty member, as examples, and then be provided with a visual map or directions to find the desired location. The interactive environment may include panoramic video, displayed only on the particular display screen (12, 14, 16) in which the user is interacting, showing the desired location or the pathway to find the desired location. An interactive environment for wayfinding may be configured for any large space, such as a mall, corporate tower or building, hotel or recreational space, airport, among many other locations.

Figure 7:
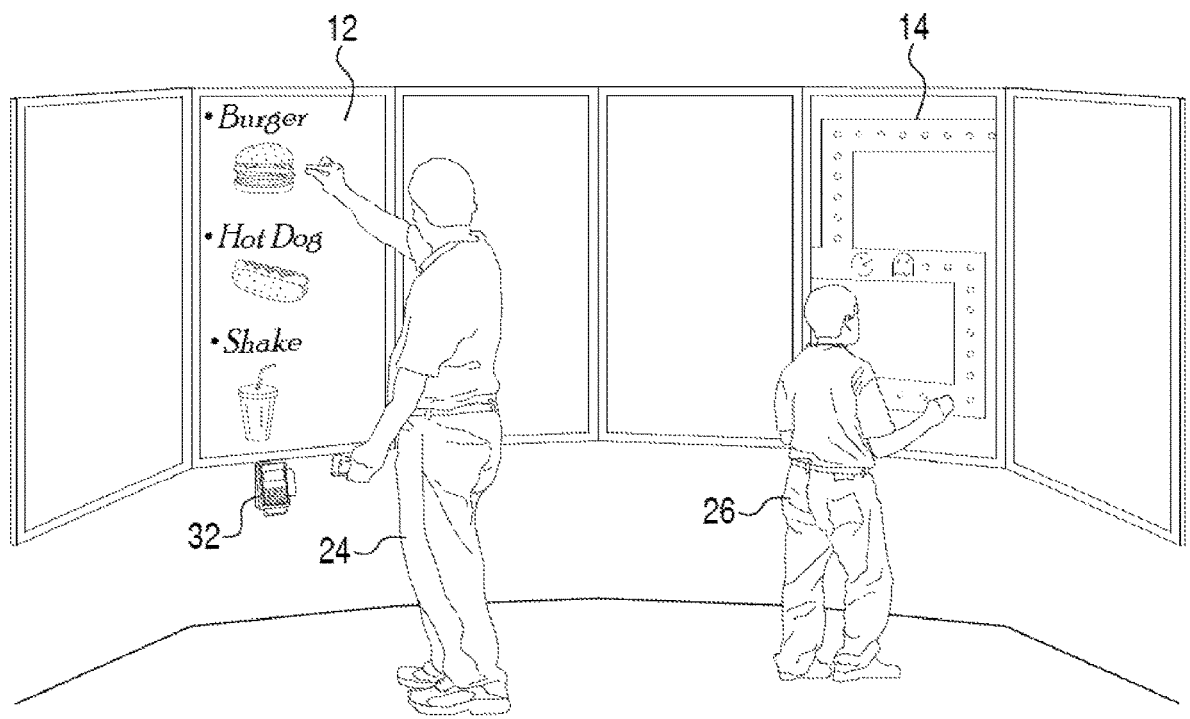
FIG. 7 depicts an exemplar multi-panel video wall system, in which one or more panels are configured for use in a quick-service restaurant (QSR) environment.

As yet another particular example, the video wall system of the present invention may be configured for use to facilitate quick-service restaurant (QSR) functionality, as shown in FIG. 7. For example, if the video wall is displayed in a QSR, all of the displays may work together to broadcast a commercial or panoramic video customized to the particular venue. When a user or customer steps up to one particular display and touches it, that individual display seamlessly transitions away from the video wall to a menu or ordering environment, in which the user can interact with that particular display screen to order food. As shown in FIG. 7, the individual display screens work independently in one or more separate user environments when the display screens transition to a stand-alone mode. For instance, one user (24) may interact with an individual display screen (12) to interact with a food ordering or menu application, in which the user (24) orders entrees and beverages at a QSR. At the same time, another user (26), who may be a child, may interact with another individual display screen (14) to engage in a separate user application or environment, such as a video gaming environment. When both users (24, 26) have completed their interaction with the individual display screens (12, 14), the entire video wall (10) may seamlessly transition back to a panoramic video display across all of the screens, as shown in FIG. 1.

As still another particular example, the video wall (10) system of the present invention may be configured for use at a sports arena, such as a ballpark like Wrigley Field. In the sports arena environment, in a default mode, the video wall (10) may display videos pertaining to the arena, the team, or to certain sponsors, among other video content. When users (24, 26) step up to the wall and touch or otherwise interact with an individual display screen (12, 14), the users may be able to scan their tickets using a barcode reader, thereby being presented with wayfinding to locate their seats. For instance, after a user scans a seat ticket, the display may present to the user a certain QR code, or similar, for being read by a user's smart phone, which then provides the user with turn-by-turn instructions for finding his or her seat. Users also may be able to upgrade their seats to a better location, using the credit card reader for payment, or may be able to trade in and/or purchase tickets to other seats at the same game or at a future game or event. Alternatively, the user may be able to access other ticket options, such as through ticket broker services like StubHub® or through season ticket holder exchanges, which are accessed through the video display screen. A user also may be to pre-order food or concessions for delivery to his or her seat, by scanning a seat ticket and using a menu application on the display screen (12, 14) to select food, beverages, or other concessions, as well as specifying the time when he or she desires that the food be delivered. For example, a user may set up prior to a baseball game an order for food and beverages to be delivered seatside after the third inning.

The display screens (12, 14) may provide the users (24, 26) with certain targeted advertising, or more in-depth advertising. For instance, the video wall (10) may include the logos of various sponsors of the venue and team, and when a user touches on a particular logo, a fly-out window is displayed on one or more of the display screens (12, 14), containing additional content about the advertiser, such as a description as to what the sponsor provides to the sports arena, along with links to allow the user to view additional content or to purchase certain sponsored products. For instance, in the example of a video wall (10) at Wrigley Field, the logo of flush valve manufacturer and sponsor SLOAN® may be shown, and upon clicking on the logo, the user may be presented with information, in a fly-out window, about SLOAN® Park, and may be further presented with an opportunity to purchase tickets to Spring Training games at SLOAN® Park, or to sign up for future information to be delivered by email or text. As another example, the video wall (10) may provide the user with availability at restaurants within the sports arena, and may allow the user to place him or herself on a waiting list at the restaurant. Alternatively, the video wall (10) may act to drive traffic to underutilized restaurants by providing the user with an instant coupon or discount at the underutilized restaurant, either in the form of a ticket or coupon that is printed out at the video wall location or electronically by associating the discount with the user's ticket, email, phone number, among other identifiers.

As still yet another particular example, the video wall (10) system of the present invention may be configured for use in a skybox or suite at a sports arena, where particularized information may be delivered to the occupants of the box or suite pertaining to the venue, team, or overall box seating experience. For instance, a user (24, 26) may approach the video wall (10), which might ordinarily be displaying a live feed of the game on the video wall. When the user touches or interacts with an individual display screen (12, 14), the video wall may transition from the live-feed video of the game to certain content options, providing the user with certain functionality that may enhance the box seating experience. For example, a user may be provided with a link or icon for ordering food or beverage. When the user clicks on that link or icon, the user is then provided with content, in a stand-alone display or in a fly-out window, for browsing and ordering food or beverage, which the user can pay for directly at the point of sale using a credit card reader or other payment device. This allows the user to pay for the particular food and beverage individually, as opposed to the food or beverage being added to the box or suite's tab. The user also may to access other individualized content. For instance, a user may be presented with links or icons for other live-TV feeds, such as other sporting events taking place at that same time, or certain curated social media live feeds, such as the official Instagram® page of the team or sports arena venue. If a user touches or clicks on the link or icon for other live-TV feeds, the user may be able to watch, in a fly-out window, live video of another sports game, such as a user desiring to watch the White Sox game while standing in a box at a Cubs game, among other examples. If a user touches or clicks on the link or icon for social media content, the user may be able to browse, in a fly-out window, certain curated social media feeds, and interact with such feeds by posting photos or videos taken by a camera connected to the video wall (10) of the users in the box seating environment while they are cheering on their team.

As still yet another particular example, the video wall (10) system of the present invention may be configured for use in a movie theater environment. In a default mode, the video wall (10) may be playing movie clips or trailers, coming attractions, or the like. Upon interaction with a user, one or more display screens (12, 14) may seamlessly transition from the video wall mode to an interactive mode wherein the user can review ticket options and make purchases and selections, select seats, change or upgrade seating options, purchase concessions and arrange for the delivery of the concessions to the user's seat at a desired time (e.g., after previews have played). The video wall (10) also may provide for entertainment functionality for children, such as gaming applications, which a child may engage with while waiting for a movie showtime, or at such time when a parent is purchasing movie tickets and concessions.

As still yet another particular example, the video wall (10) system of the present invention may be configured for use as a donor wall for facilitating charitable or other donations and/or payments from users interacting with the video wall (10) system. For instance, the video wall (10) may be located at an educational institution or a charitable organization, and may provide a video relating to the education institution or charitable organization, such as one promoting a fundraiser or a capital campaign. A user, desiring to participate in or donate to the fundraiser or capital campaign may tap, touch, or otherwise interact with the video wall (10), at which point the particular display screen, or a set of display screens (12, 14) immediately and seamlessly transition from the displayed video to an interactive user environment in which the user may provide a donation by credit card, using the magnetic stripe reader (32) or similar credit card processing peripheral, and input any desired or required donor information using a pop-up virtual keyboard displayed on the display screen (12, 14) immediately adjacent to the user.

As still yet another particular example, the video wall (10) system of the present invention may be configured for use in a laboratory, operating room, or other controlled or sterile environment, where interaction with users is limited only to detection of hand gesturing and/or tracking of eyeball movement, that is, touch-free interaction. In such an environment, the video wall (10) may be configured with a plurality of cameras (30) to interact simultaneously with a plurality of users. The individual users may interact with individual displays to select content, for instance, to select email or instant message inboxes and view messages, or to create charts or lab reports, or to upload the same to cloud storage databases, as examples. Each such user interacts with the video wall panel by using hand gesturing and/or with eyeball tracking to control a mouse pointer on screen. The video wall (10) seamlessly transitions from that user interactive mode to the full-screen video wall to present content to all of the users, such as displaying a remote videoconference or a live feed or television broadcast. Alternatively, a user interacting with one panel may desire to display an image or a lab report, for instance, to the entire room and can command the video wall, for instance using voice commands, seamlessly transition from the user interactive mode to the full-screen video wall mode to present the desired image across all of the panels. Such process may be desirable to enlarge or zoom-in on a desired image or other such certain content. At the same time, the video wall (10) may be configured to receive certain analytical information about the users, such as to record actions taken by the users, or to track user movement, user interaction times, and so forth. Such analytical tracking may be desirable in the context of a workspace where an employee's time in the workspace may be tracked (i.e., employee check-in and check-out), or time spent on certain projects may be meaningfully tracked to assess efficiency or other performance metrics.

As still yet another particular example, the video wall (10) system of the present invention may be configured for use as a virtual classroom or videoconferencing environment in which remotely located students or participants can interact with a classroom or central location via video wall (10). In this configuration, a remotely located user may appear on one or a portion of one or more display screens (12, 14) via a smart phone camera or web camera, such as a typical camera incorporated within many laptop computers or desktop display screens. A plurality of remotely located users each may appear at once on one or more portions of the display screens (12, 14) or each may appear on a separate display screen. The video wall (10) provides the remotely located user with one or more video feeds or views of the classroom or central location via camera (30) such that the remotely located user can view the central location, at the same time while a teacher or other on-site users interacting with the video wall (10) can see the face of the remotely located user in real-time. In a default running mode, the remotely located user is muted such that the user hears discussion within the classroom or central location but the remotely located user is not audible to or heard by the teacher or other users on-site at the central location. If the remotely located user has a question or desires to speak and/or be heard by the teacher or other on-site users, the remotely located user may raise his or her hand, as would be done in a classroom setting, or virtually raise his or her hand by effectuating a user setting in the viewing environment on his or her smart phone or laptop, thereby providing the teacher or other on-site users with an indication that the remotely located user desires to speak. The teacher or other on-site user then taps on the remotely located user's image on the video wall (10), which causes that particular display screen (12, 14) or a set of display screens, such as three adjacent display screens, to seamlessly transition from the video wall (10) to a stand-alone interactive environment. For example, upon the seamless transition, one or a set of display screens (12, 14) may transition to display the remotely located user via that user's smart phone or laptop camera. At the same time, the remotely located user's audio is activated such that the remotely located user may be heard by the teacher or other users on-site at the classroom or central location. In this interactive environment mode, the remotely located user may be heard and may interact with the teacher or other on-site users at the central location. When the remotely located user has finished speaking, the teacher or another on-site user taps the display screen (12, 14) displaying that remote user, and that display screen or set of display screens immediately and seamlessly transition back from the stand-alone interactive mode back into the video wall (10) mode. At the same time, the video wall (10) discontinues the audio of the remote location such that the remotely located user is muted and no longer heard by the teacher or other users on-site at the classroom or central location.

As still yet another particular example, the video wall (10) system of the present invention may be configured for use with or for providing concierge services, such as a virtual concierge assistant. An example may be where a partial or full video wall (10) system is provided en suite in a hotel setting, such as in a guest's residence, allowing for the guest to interact with the hotel concierge or staff via the video wall. In such a setting, the wall may be comprised of only a single display or a limited number, such as two or three displays, as size may not provide for any more. A guest seeking to interact with the hotel concierge may tap on the video wall (10) and request assistance with, for instance, making dinner accommodations at an area restaurant. The virtual concierge may be comprised of a concierge employee working in the hotel or working for the hotel, perhaps at a remote location. Alternatively, the concierge assistant may be entirely virtual, operated by the video wall (10) to interact with the user and provide certain services, such as booking dinner reservations, ordering room service, reviewing and paying hotel bills, and checking out, as just examples.

In this configuration of the video wall (10), one or more cameras (30) may be used to interact with a plurality of users at the same time. For instance, one or more users located on-site may interact with the video wall to communicate with one or more remotely located users, and the cameras may be configured to detect gesturing and/or eye movement of the on-site users to select certain content displayed on the wall. Not only so, but one of more cameras may be located on site but not in physical connection with the wall. For example, a plurality of cameras may be mounted proximate to users, such as, for instance, mounted in seat backs, allowing individual on-site users to interact with the video wall using gesturing and/or eye tracking.

The video wall (10) also may have an auxiliary display or tile, or a separate tablet or smartphone device, for controlling the entire wall such that the teacher or another on-site user may tap or select a certain remote user on the auxiliary display or tile, or tablet controller, to initiate the sequence whereby the video wall feed seamlessly transitions from display of all remote users to an interactive mode spotlighting the selected user, and upon that seamless transition, the selected remote user's audio may be enabled to allow two-way conversation and audio with the remote user. Alternatively, the video wall (10) may be configured for use with speech recognition such that the teacher or another on-site user may recognize a certain remote user by uttering certain speech commands, which in turn initiate the sequence of seamlessly transitioning the video wall display to one of an interactive user environment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended set of claims.

What is claimed is:

1. A video wall system comprising:
   a computer having a memory containing a media file and a processor for executing the media file, the computer having an Internet connection for access to at least one remote Javascript database;
   at least one video display interconnected to the computer, the at least one video display configured to display a video content generated from the media file that extends across the at least one video display, and the at least one video display configured to operate independently to display one or more separate video contents generated from the media file;
   wherein the at least one video display is configured to seamlessly transition away from the video content upon initiation by the user to display a separate video content for interaction with the user.

2. The video wall system of claim 1 wherein the computer memory contains front end software for displaying the media file and back end software for pulling instructions and content from the at least one Javascript database, and upon initiation by a user, the back end software is configured to instruct the front end software to display the separate interactive video content.

3. The video wall system of claim 2 wherein the back end software contains one or more Javascript components and the front end software is configured to pull instructions from at least one Javascript component through which the back end software is configured to serve the separate interactive video content.

4. The video wall system of claim 2 wherein the back end software stores content on a document-based database.

5. The video wall system of claim 2 wherein the back end software stores content in a simple storage service.

6. The video wall system of claim 5 wherein the video content is generated by streaming from the simple storage service.

7. The video wall system of claim 2 wherein the back end software is configured to pull instructions and content from a first Javascript database and then from a second Javascript database.

8. The video wall system of claim 7 wherein the back end software is configured to pull instructions and content from the first Javascript database at one predefined time and from the second Javascript database at another predefined time.

9. The video wall system of claim 8 wherein the back end software is configured to update content from the first Javascript database at one predefined time and from the second Javascript database at another predefined time.

10. The video wall system of claim 1 wherein the media file is stored on the at least one Javascript database.

11. A method for displaying a separate interactive video content on a video wall to a user, the video wall having at least one video display forming the video wall, the method comprising the steps of:
    providing a computer having a memory containing a media file and a processor for executing the media file, the computer being interconnected with the video wall and having an Internet connection for accessing at least one remote Javascript database;
    displaying a video content across the at least one video display, the video content generated from the media file;
    detecting a user and seamlessly transitioning the at least one video display from the video content to a separate video content for interaction with the user; and
    displaying the separate interactive video content on the at least one video display for interacting with the user.

12. The method of claim 11 wherein the computer memory contains front end software for displaying the media file and back end software for pulling instructions and content from the at least one Javascript database, and upon initiation by a user, the back end software instructs the front end software to display the separate interactive video content.

13. The method of claim 12 wherein the back end software contains one or more Javascript components and the front end software pulls instructions from at least one Javascript component through which the back end software is configured to serve the separate interactive video content.

14. The method of claim 12 wherein the back end software stores content on a document-based database.

15. The method of claim 12 wherein the back end software stores content in a simple storage service.

16. The method of claim 15 wherein the video content is generated by streaming from the simple storage service.

17. The method of claim 12 wherein the back end software pulls instructions and content from a first Javascript database and then from a second Javascript database.

18. The method of claim 17 wherein the back end software pulls instructions and content from the first Javascript database at one predefined time and from the second Javascript database at another predefined time.

19. The method of claim 18 wherein the back end software updates content from the first Javascript database at one predefined time and from the second Javascript database at another predefined time.

20. The method of claim 11 wherein the media file is stored on the at least one Javascript database.

* * * * *